(12) United States Patent
Ribas Machado das Neves et al.

(10) Patent No.: US 11,468,883 B2
(45) Date of Patent: Oct. 11, 2022

(54) MESSAGING SYSTEM WITH TREND ANALYSIS OF CONTENT

(71) Applicant: Snap Inc., Santa Monica, CA (US)

(72) Inventors: Leonardo Ribas Machado das Neves, Marina del Rey, CA (US); Vitor Silva Sousa, Los Angeles, CA (US); Shubham Vij, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/948,582

(22) Filed: Sep. 24, 2020

(65) Prior Publication Data

US 2021/0335350 A1      Oct. 28, 2021

Related U.S. Application Data

(60) Provisional application No. 62/704,163, filed on Apr. 24, 2020.

(51) Int. Cl.
| | |
|---|---|
| *G10L 15/18* | (2013.01) |
| *H04L 51/10* | (2022.01) |
| *G10L 15/197* | (2013.01) |

(52) U.S. Cl.
CPC ........ *G10L 15/1822* (2013.01); *G10L 15/197* (2013.01); *H04L 51/10* (2013.01)

(58) Field of Classification Search
CPC ... G10L 15/1822; G10L 15/197; H04L 51/10; H04L 51/18; H04L 51/20; H04L 51/32; G06F 40/279; G06F 16/353

(Continued)

(56) References Cited

U.S. PATENT DOCUMENTS 9,575,952 B2    2/2017  Kumar Rangarajan Sridhar
9,818,400 B2 *  11/2017 Paulik ................. G06F 16/9535
(Continued)

FOREIGN PATENT DOCUMENTS

WO    WO-2021217167 A1    10/2021

OTHER PUBLICATIONS

"International Application Serial No. PCT/US2021/070398, International Search Report dated Aug. 6, 2021", 4 pgs.

(Continued)

*Primary Examiner* — Thuykhanh Le
(74) *Attorney, Agent, or Firm* — Schwegman Lundberg & Woessner, P.A.

(57) ABSTRACT

A messaging system performs trend analysis on content produced by users of the messaging system. The messaging system is configured to extract modifications from content items received from client devices associated with users where the content items are modified using the modifications that comprises a text caption or a media overlay. The messaging system is further configured to determine one or more words from the content items and the extracted modifications and determine a frequency of the one or more words in the content items and the extracted modifications. The messaging system is further configured to determine whether the one or more words is a trend based on the frequency and an aggregate frequency. The messaging system is further configured to in response to the one or more words being determined as the trend, generating trend content associated with the one or more words, the trend content being a text, an image, or an augmentation content.

18 Claims, 27 Drawing Sheets

(58) Field of Classification Search
USPC .......................................................... 704/9
See application file for complete search history.

(56) References Cited

U.S. PATENT DOCUMENTS

| | | | |
|---|---|---|---|
| 10,155,168 B2* | 12/2018 | Blackstock | G06T 11/00 |
| 10,387,514 B1* | 8/2019 | Yang | G06N 3/08 |
| 10,388,274 B1* | 8/2019 | Hoffmeister | G06N 3/0445 |
| 10,650,009 B2* | 5/2020 | Tanikella | G06Q 30/0241 |
| 10,684,738 B1* | 6/2020 | Sicora | G06F 16/435 |
| 10,762,903 B1* | 9/2020 | Kahan | G10L 15/26 |
| 2012/0191841 A1* | 7/2012 | Swamidas | G06F 16/24578 709/224 |
| 2012/0272160 A1* | 10/2012 | Spivack | G06N 5/046 715/752 |
| 2013/0298038 A1* | 11/2013 | Spivack | G06F 3/0484 715/753 |
| 2014/0278367 A1* | 9/2014 | Markman | G06F 40/253 704/9 |
| 2014/0297765 A1* | 10/2014 | Beckley | H04L 51/52 709/206 |
| 2015/0046152 A1* | 2/2015 | Lee | G06F 16/35 704/9 |
| 2015/0074131 A1* | 3/2015 | Fernandez | G06F 16/435 707/758 |
| 2015/0169539 A1* | 6/2015 | Jamrog | G06F 40/205 704/9 |
| 2015/0186417 A1* | 7/2015 | Olteanu | G06F 16/24578 707/748 |
| 2015/0319203 A1* | 11/2015 | Jeremias | H04L 51/222 715/753 |
| 2015/0365447 A1* | 12/2015 | Klein | G06F 16/00 709/204 |
| 2016/0019885 A1* | 1/2016 | Romano | G06F 40/109 704/9 |
| 2016/0110343 A1* | 4/2016 | Kumar Rangarajan Sridhar | G06F 40/216 704/9 |
| 2016/0203122 A1* | 7/2016 | Wright | G06F 40/30 704/9 |
| 2016/0292157 A1* | 10/2016 | Zhang | G06Q 50/10 |
| 2016/0371272 A1* | 12/2016 | Grainger | H04L 51/18 |
| 2017/0034654 A1* | 2/2017 | Oberbeck | H04N 21/6405 |
| 2017/0147652 A1* | 5/2017 | Kuo | G06F 16/21 |
| 2017/0147676 A1* | 5/2017 | Jaidka | G06F 16/35 |
| 2017/0264578 A1* | 9/2017 | Allen | H04L 12/1859 |
| 2017/0316517 A1* | 11/2017 | Shunock | H04L 63/101 |
| 2017/0330292 A1* | 11/2017 | Lancar | G06Q 30/0269 |
| 2018/0032886 A1* | 2/2018 | Danson | G06F 40/279 |
| 2018/0034931 A1* | 2/2018 | Chakra | H04L 67/1097 |
| 2018/0077344 A1* | 3/2018 | Bostick | H04N 5/23219 |
| 2018/0091468 A1* | 3/2018 | Yong | H04L 51/216 |
| 2018/0293306 A1* | 10/2018 | Park | H04L 51/214 |
| 2018/0293608 A1* | 10/2018 | Li | G06Q 30/0246 |
| 2018/0336183 A1* | 11/2018 | Lee | G06N 3/08 |
| 2018/0367484 A1* | 12/2018 | Rodriguez | H04L 51/02 |
| 2019/0012834 A1* | 1/2019 | Friedman | G06T 19/00 |
| 2019/0259387 A1* | 8/2019 | Mertens | G06Q 10/103 |
| 2019/0303417 A1* | 10/2019 | Twyman | G06F 16/9535 |
| 2020/0081975 A1* | 3/2020 | Yadav | G06F 16/355 |
| 2020/0089705 A1* | 3/2020 | Roswell | G06F 3/0482 |
| 2020/0104337 A1* | 4/2020 | Kelly | G06F 16/906 |
| 2020/0151254 A1* | 5/2020 | Wohlwend | G10L 15/16 |
| 2020/0219294 A1* | 7/2020 | Badr | H04N 7/147 |
| 2020/0250249 A1* | 8/2020 | Fedoryszak | H04L 51/52 |
| 2020/0402118 A1* | 12/2020 | Perry | H04L 51/52 |
| 2020/0403954 A1* | 12/2020 | Perry | H04L 51/52 |
| 2021/0051124 A1* | 2/2021 | Kumar | H04L 51/52 |
| 2021/0119951 A1* | 4/2021 | Santos | G06F 40/284 |
| 2021/0119959 A1* | 4/2021 | Gaydos | H04L 61/10 |
| 2021/0266397 A1* | 8/2021 | Grewal | H04M 1/7243 |

OTHER PUBLICATIONS

"International Application Serial No. PCT/US2021/070398, Written Opinion dated Aug. 6, 2021", 8 pgs.
"Twitter Trending Hashtags and Topics—Trendsmap", [Online] Retrieved from the Internet: <URL: https://web.archive.org/web/20200401100844/https://www.trendsmap.com/>, (Apr. 1, 2020), 1 pg.
Gordon, Steven, "Google Trends: A Metric of Consumer Behavior", Sphere Quantitative Insights, (2017), 4 pgs.
Hendrickson, Scott, "Trend Detection in Social Data", GNIP, Twitter, Inc., [Online] Retrieved from the Internet: <URL: https://developer.twitter.com/content/dam/developer-twitter/pdfs-and-files/Trend-Detection.pdf>, (2015), 19 pgs.
Lu, Rong, "Trend Analysis of News Topics on Twitter", International Journal of Machine Learning and Computing, 2(3), (Jun. 2012), 327-332.
Mohebbi, Matt, "Google Correlate Whitepaper", [Online] Retrieved from the Internet: <URL: https://static.googleusercontent.com/media/research>, (Jun. 9, 2011), 6 pgs.
Rathod, Tejal, "Trend Analysis on Twitter for Predicting Public Opinion on Ongoing Events", International Journal of Computer Applications (0975-8887), 180(26), (2018), 5 pgs.

* cited by examiner

MESSAGING SYSTEM WITH TREND ANALYSIS OF CONTENT

PRIORITY CLAIM

This application claims the benefit of priority under 35 USC 119(e) to U.S. Provisional Patent Application Ser. No. 62/704,163, filed Apr. 24, 2020, which is incorporated herein by reference in their entirety.

TECHNICAL FIELD

Embodiments of the present disclosure relate generally to trend analysis of content within messaging systems. More particularly, but not by way of limitation, embodiments of the present disclosure relate to determining trends based on analyzing content generated in a messaging system and based on the determined trends generating new content and/or new modifications.

BACKGROUND

Current messaging systems provide the opportunity for users to produce and post content such as images and video. The content is made available in the messaging systems for other users to consume. The users may produce a very large amount of content. For example, there may be millions of images and videos available for users to consume. It may be difficult or time consuming to find content that is currently popular or trending. Additionally, it may be difficult for users to find other users that are interested in the same type of content and it may be difficult for users to determine topics for content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
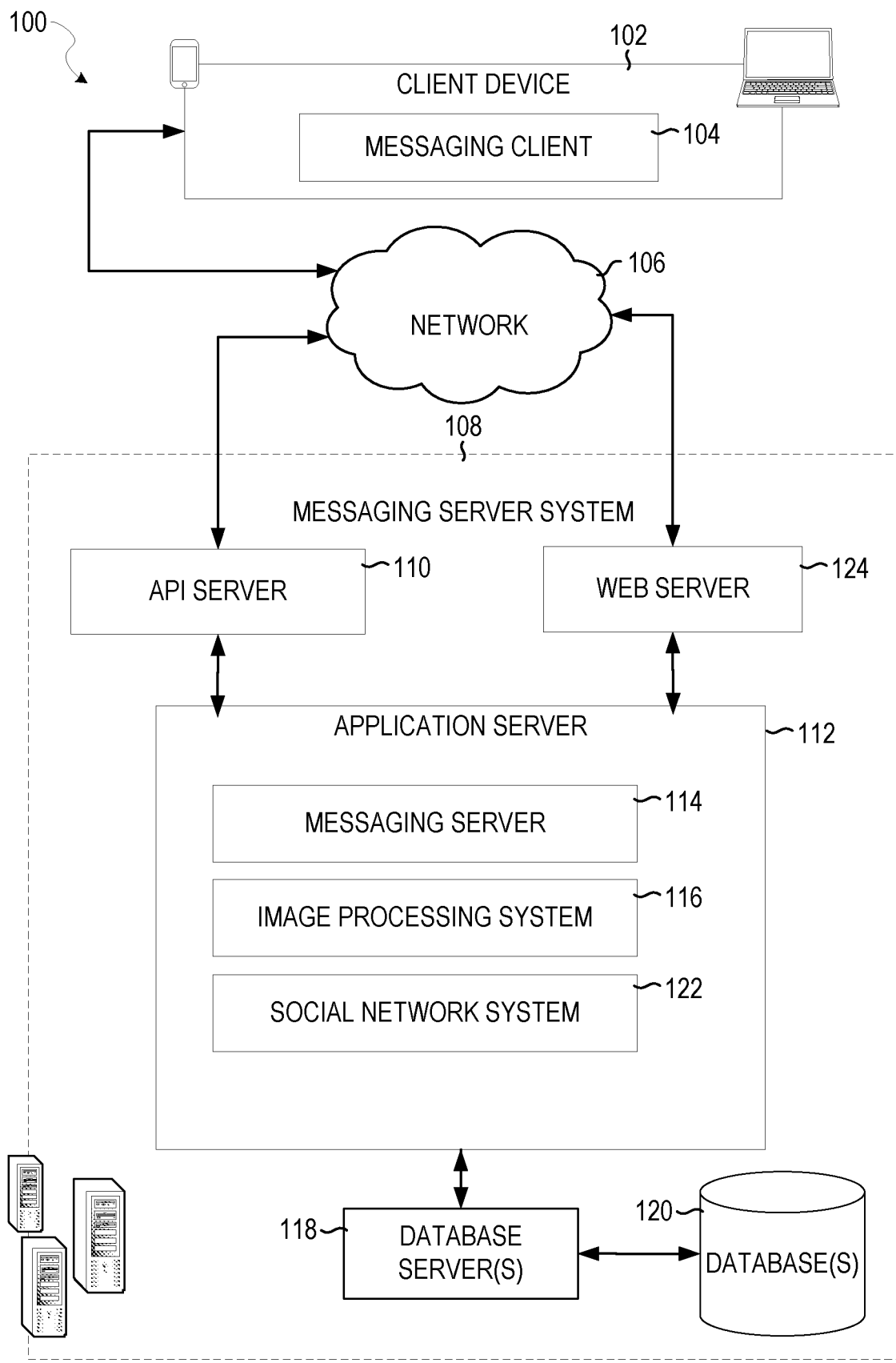
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed is a messaging system that determines trends from content that is produced and consumed by users of the messaging system. The messaging system analyzes the users, content, production of the content data, and consumption of the content data to determine n-grams so that the content produced in the messaging system may be characterized by the n-grams. The n-gram is n words, in accordance with some embodiments. Example n-grams include "Royal Wedding", "Super Tuesday", "Avatar", "Michael Jordan", etc. N-grams are determined from the content, in accordance with some embodiments. N-grams can be a contiguous sequence of n items from a given sample of text or speech. For example, the items can be phonemes, syllables, letters, words or base pairs. The messaging system then determines which of the determined n-grams are trending. In some embodiments, a popularity score is determined for the n-grams. In some embodiments, a passion score is determined for the n-grams based on interaction with the content by the users such as how much time the users spent viewing the content.

The messaging system takes the various generated databases regarding the content and users and generates an aggregated database that removes the personal information of the users in order to ensure the privacy of the users. In some embodiments, the messaging system deletes generated databases that expose the private data of the users. Some embodiments improve the identification of trends by generating n-grams that are based on objects identified in images that are part of messages sent by users of the messaging system.

In some embodiments, the messaging system determines which n-grams are trends based on a normalized frequency of use. In some embodiments, the messaging system adjusts a score for each n-gram based on external events that may either increase a frequency of the n-gram or decrease the frequency of the n-gram. In some embodiments, the messaging system determines popularity or passion scores for the n-grams over a number of time windows and n-grams are selected as trends based on the popularity or passion of the n-gram over the number of time windows.

Some embodiments provide a technical solution to the technical problem of identifying short phrases such as n-grams that categorize messages sent in a messaging system. Some embodiments provide a technical solution to the technical problem of determining which short phrases or n-grams that characterize messages are trending within a messaging system where many millions of messages are being sent within the messaging system every day. Some embodiments provide a technical solution to the technical problem of using user profile data of users of a messaging system while maintaining privacy for individual users. The messaging system may further classify n-grams as developing trends, growing trends, declining trends, spiking trends, and so forth.

Some embodiments have the advantage of improving content consumption by users of a messaging system by recommending content that is trending to the users. Some embodiments improve the availability of content on a messaging system by recommending to users of the messaging system to produce content related to current trending topics. Some embodiments improve the targeting of and price that may be charged for advertisements by targeting advertisements that are related to trends within the messaging system. Some embodiments improve the environment for users to produce messages by using trends to generate modification content such as stickers, captions, and songs that may be added to messages and that are related to current trends.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
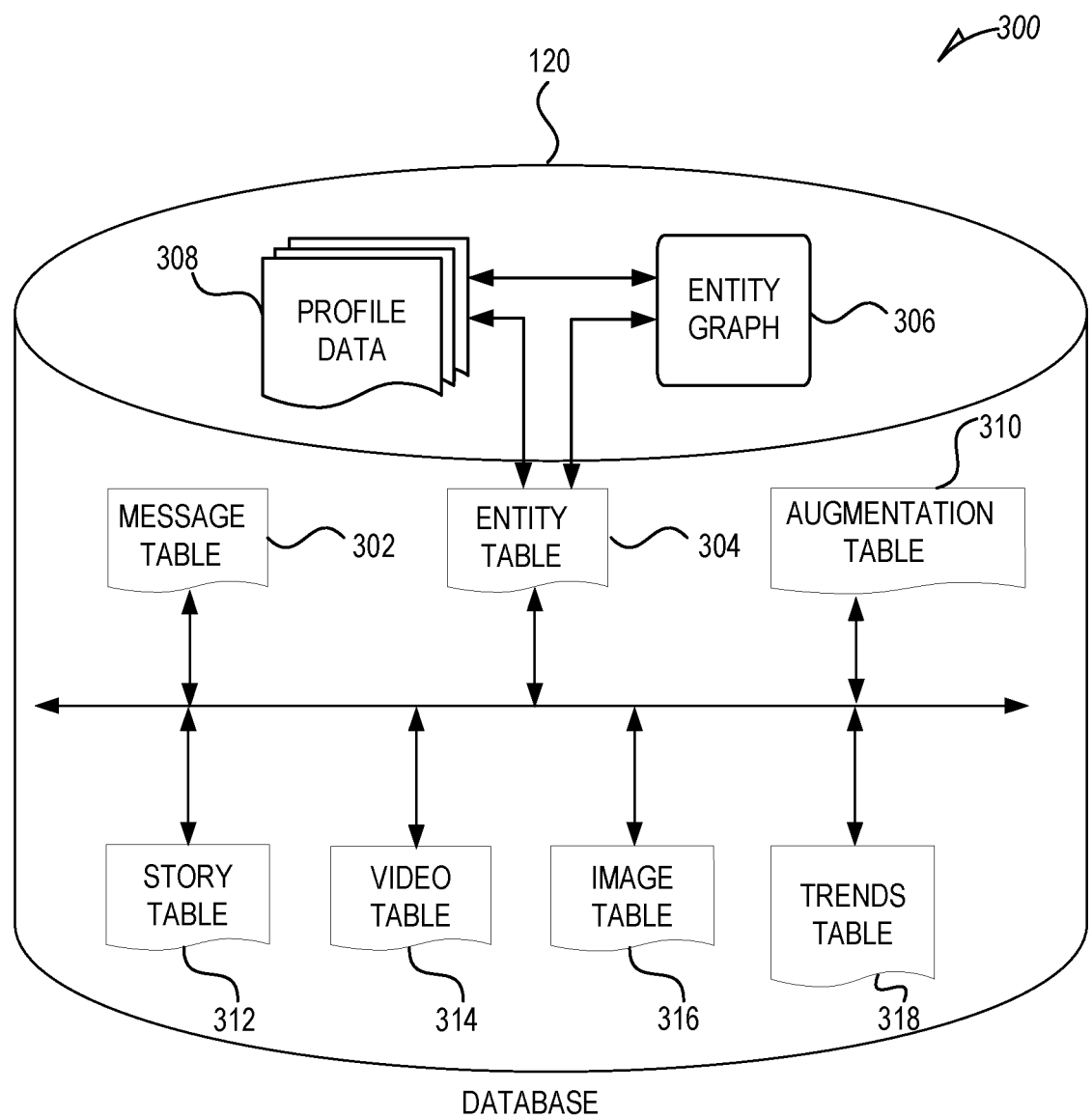
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
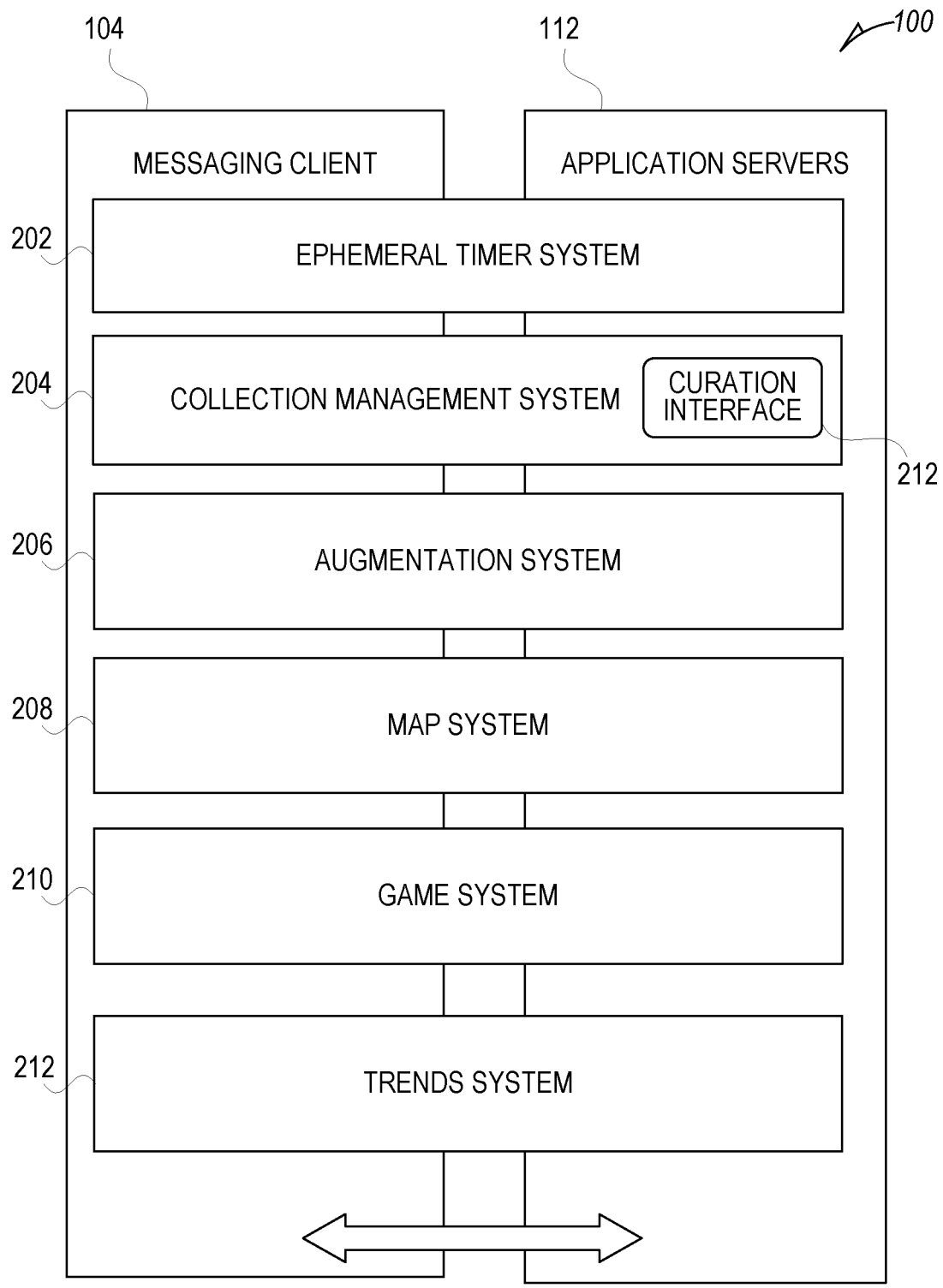
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an modification system 206, a map system 208, a game system 210, and a trends system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 9:
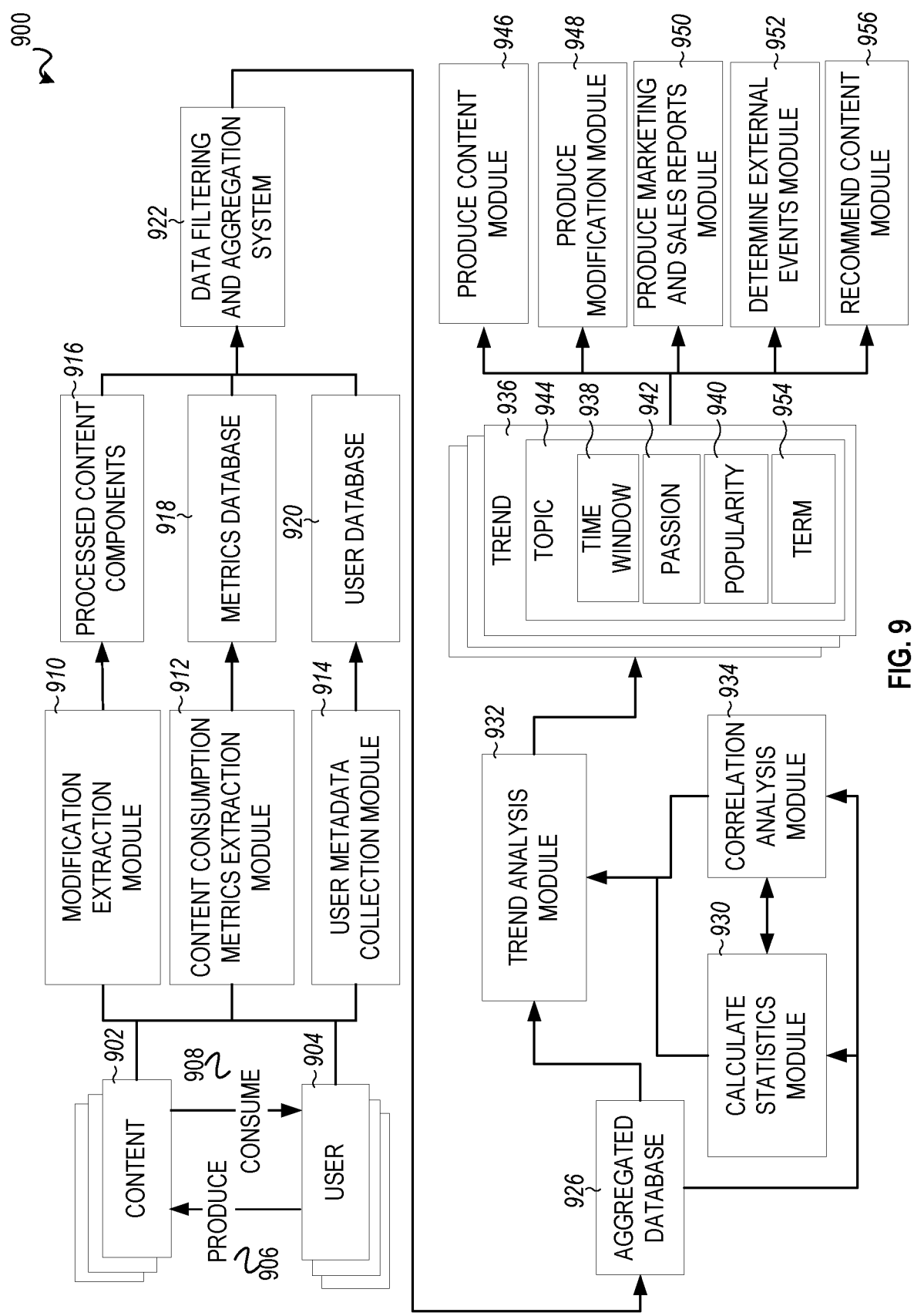
FIG. 9 illustrates a system for determining trends, in accordance with some embodiments.

The trends system 212 provides various functions related to determining trends and supports providing recommendations based on trends to the messaging client 104. The trends system 212 provides a system to aid in the generation of additional modifications that the augmentation system 206 may provide to the messaging client 104. A modification may be termed an augmentation, in accordance with some embodiments. The trends system 212 may monitor and determine statistics related to content generated within the messaging system 100. The trends system 212 may monitor the activity of the collection management system 204, augmentation system 206, map system 208, and game system 210 as well as other activities of the messaging client 104 and application servers 112 to determine content that is trending. The trends system 212 may generate recommendations to the messaging client 104 and/or application servers 112 such as which content to display or suggest to users. The trends system 212 may produce additional content or suggest which category of content should be produced. The trends system 212 may produce reports that may be used for marketing and sales and that may determine which content includes advertisements and to help determine a value for an advertisement. The trends system 212 may analyze content and determine external events such as the pandemic from the coronavirus and generate new content to indicate the external events. FIG. 9 provides an overview of the trends system 212.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database 120 can also store, referring to FIG. 9, processed content components 916, metrics database 918, user database 920, aggregated database 926, and trends 936, in a trends table 318.

Data Communications Architecture

Figure 4:
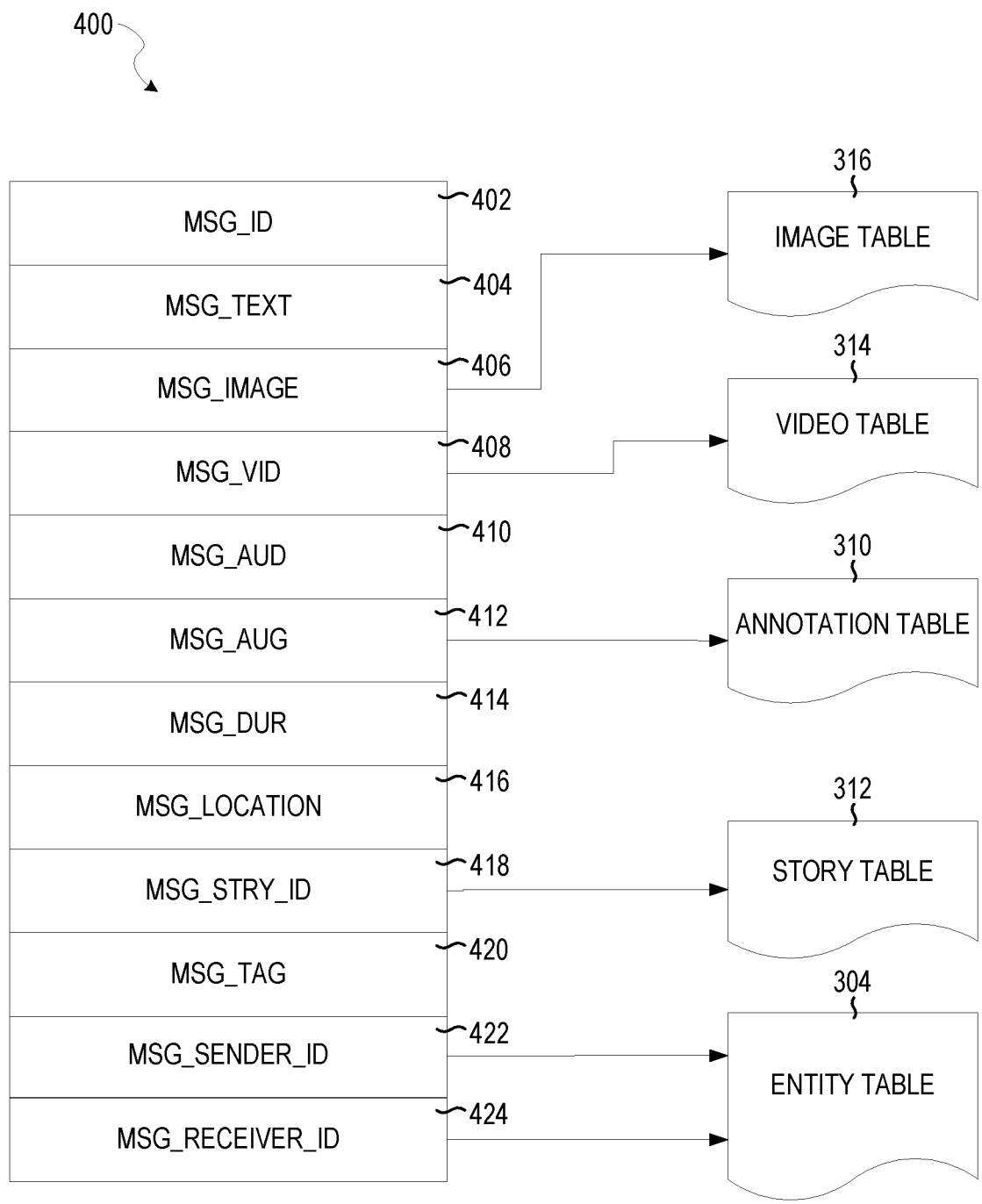
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
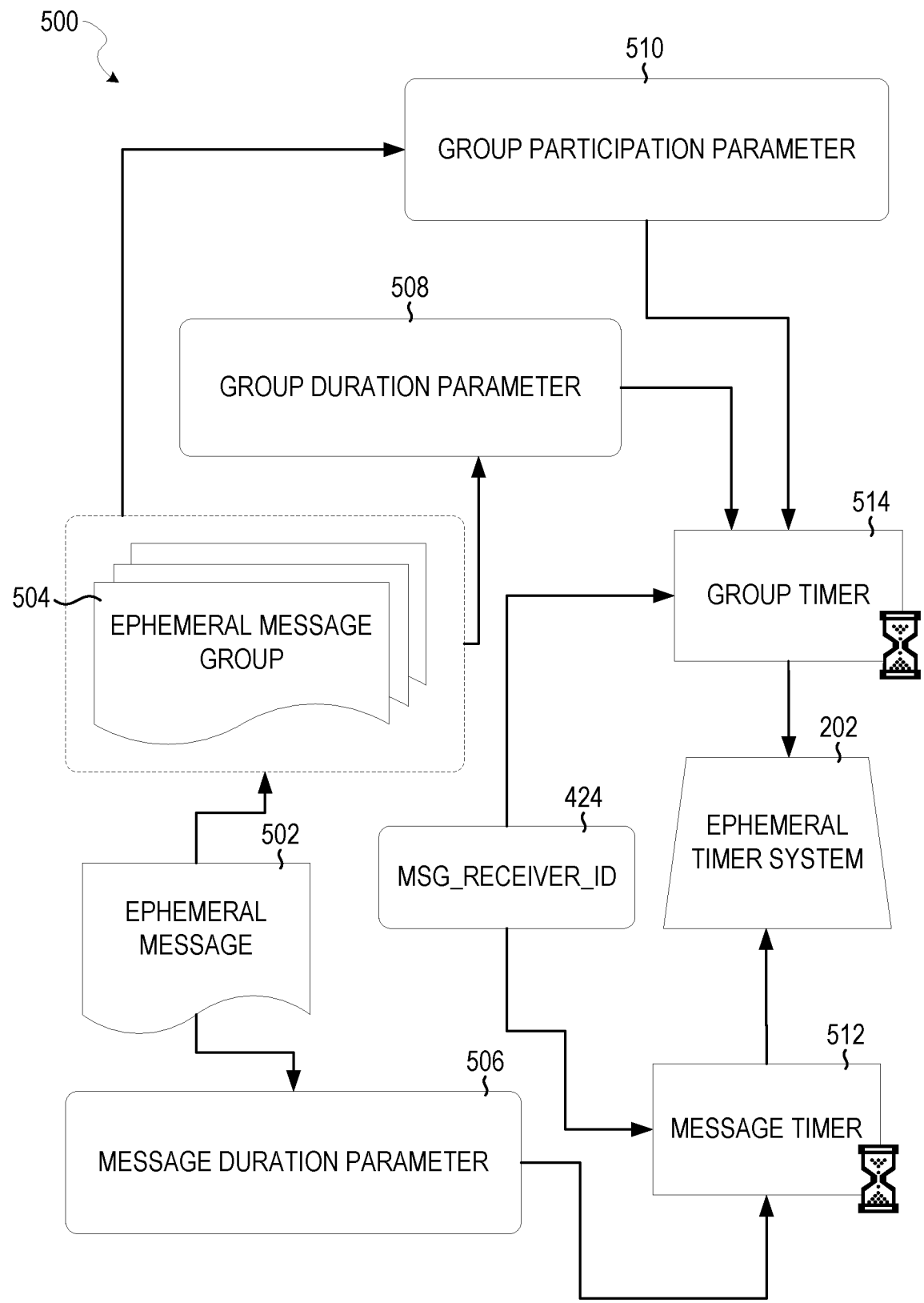
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Machine Architecture

Figure 6:
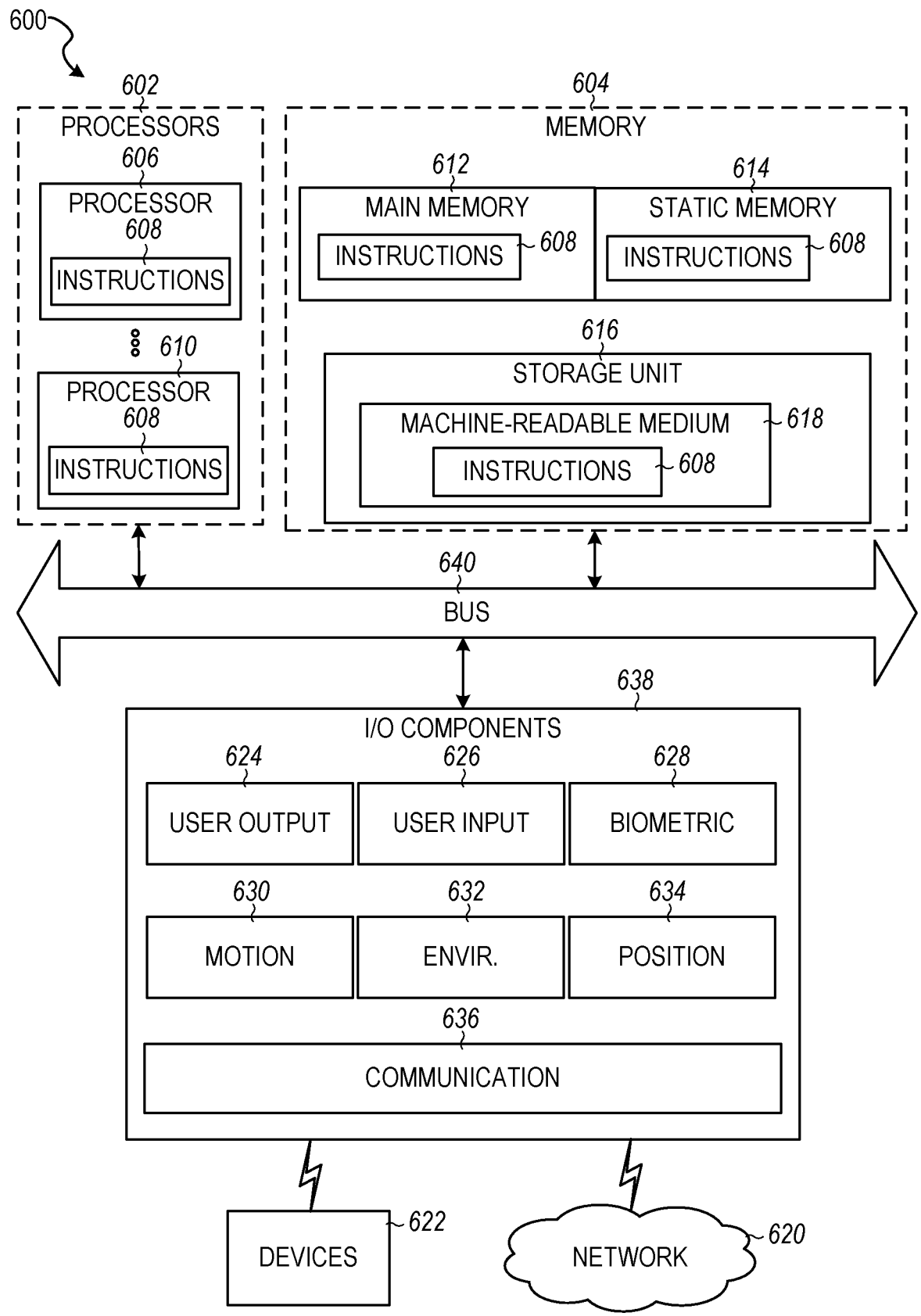
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. The processors 602 may be termed computer processors, in accordance with some embodiments. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 further include communication components 636 operable to couple the machine 600 to a network 620 or devices 622 via respective coupling or connections. For example, the communication components 636 may include a network interface Component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Software Architecture

Figure 7:
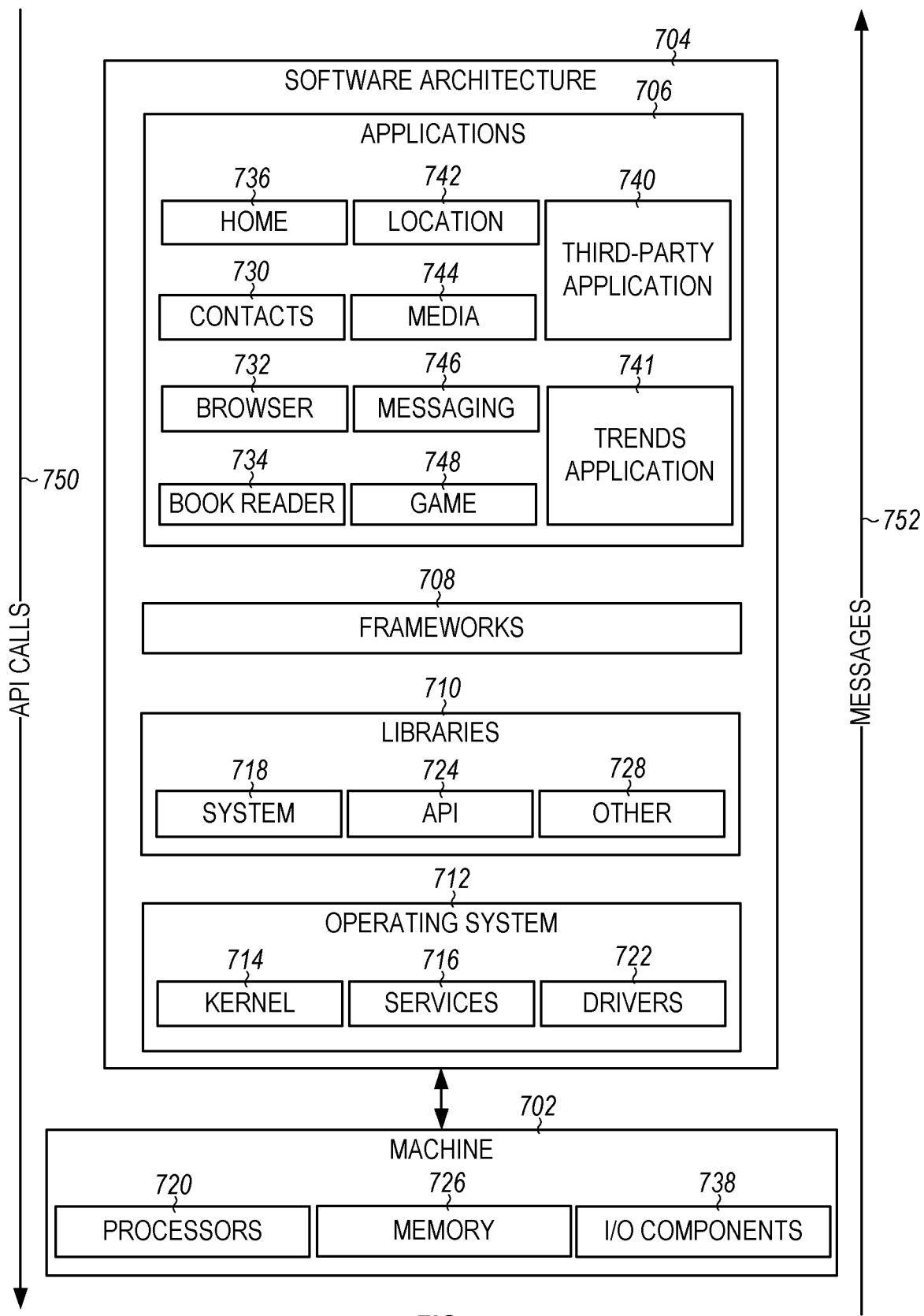
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a trends application 741, a location application 742, a media application 744, a messaging application 746, a game application 748, and a broad assortment of other applications such as a third-party application 740. The trends application 741 may be the same or similar as disclosed in conjunction with FIG. 9 and herein. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Processing Components

Figure 8:
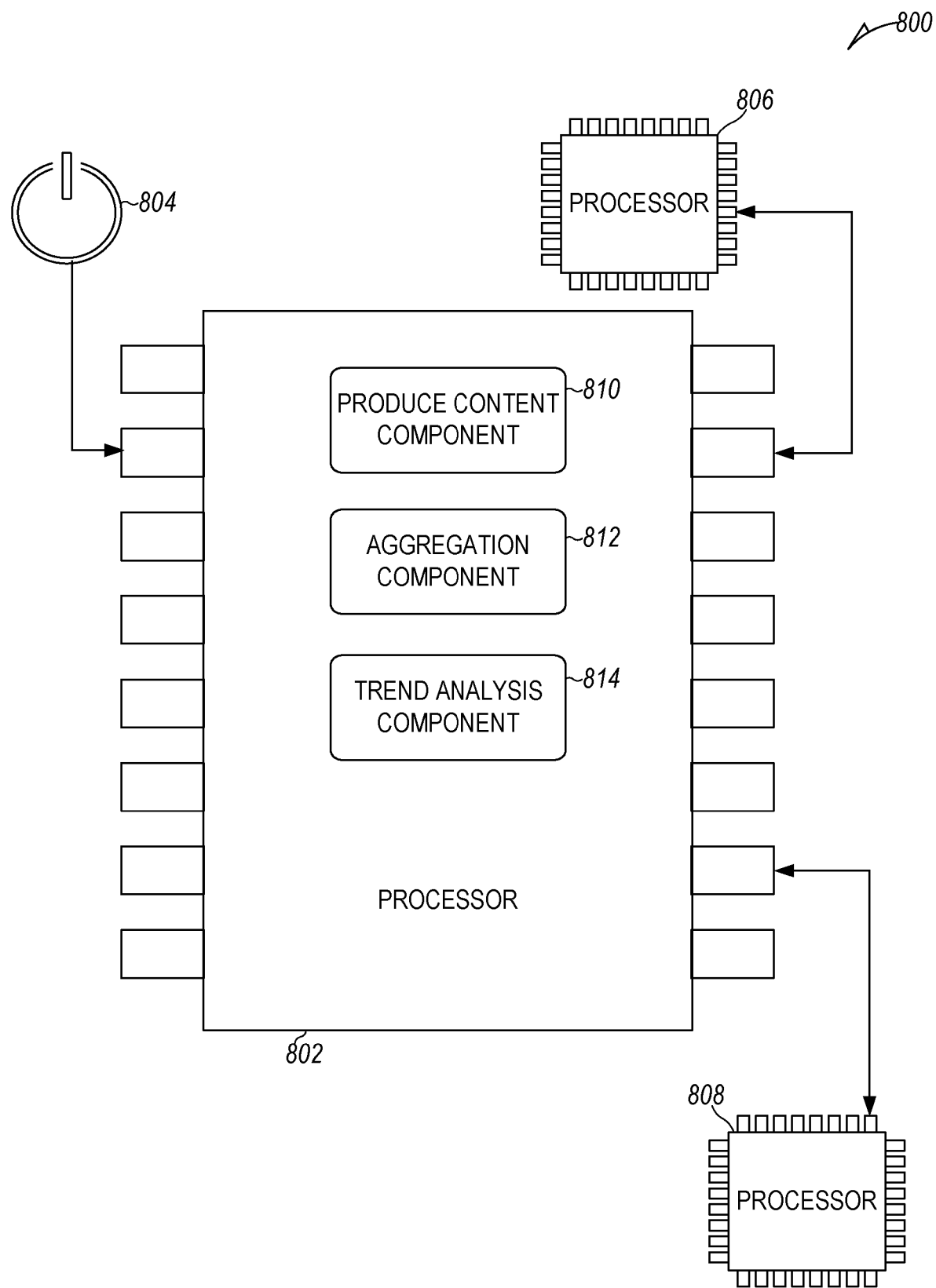
FIG. 8 is a diagrammatic representation of a processing environment, in accordance with some examples.

Turning now to FIG. 8, there is shown a diagrammatic representation of a processing environment 800, which includes a processor 802, a processor 806, and a processor 808 (e.g., a GPU, CPU or combination thereof). The processor 802 is shown to be coupled to a power source 804, and to include (either permanently configured or temporarily instantiated) modules, namely a produce content component 810, a data filtering and aggregation component 812, and a trend analysis component 814. Referring to FIG. 9, the product content component 810 operationally generates processed content components 916, metrics database 918, and user database 920; the data filtering and aggregation component 812 operationally generates aggregated database 926; and, the trend analysis component 814 operationally generates trends 936. As illustrated, the processor 802 is communicatively coupled to both the processor 806 and the processor 808.

Trends System

FIG. 9 illustrates a system 900 for determining trends, in accordance with some embodiments. Illustrated in FIG. 9 is content 902, user 904, produce 906, consume 908, modification extraction module 910, content consumption metrics extraction module 912, user metadata collection module 914, processed content components 916, metrics database 918, user database 920, data filtering and aggregation system 922, aggregated database 926, calculate statistics module 930, trend analysis module 932, correlation analysis module 934, trend 936, time window 938, popularity 940, passion 942, topic 944, term 954, produce content module 946, produce modification module 948, produce marketing and sales reports module 950, determine external events module 952, and recommend content module 956.

The system 900 analyzes data from content 902, user 904, produce 906, and consume 908 to generate trends 936, which may be used by produce content module 946, produce modification module 948, produce marketing and sales reports module 950, determine external events module 952, and/or recommend content module 956.

A trend 936 includes topic 944, time window 938, passion 942, popularity 940, and term 954. A topic 944 and/or a term 954 is a trend 936 when the system 900 determines the topic 944 and/or term 954 is popular 940 by the users or for which the users have a passion 942 where the determination is made relative to other topics 944 and/or terms 954. The term 954 is an n-gram, in accordance with some embodiments.

The n-gram is n words, in accordance with some embodiments. Example n-grams include "Royal Wedding", "Super Tuesday", "Avatar", "Michael Jordan", etc. N-grams are determined from the content 902, in accordance with some embodiments. N-grams can be a contiguous sequence of n items from a given sample of text or speech. For example, the items can be phonemes, syllables, letters, words or base pairs. The topic 944 is a category of terms 954 such as pandemic, basketball, computer games, cable television, and so forth. The topic 944 can have more than one term 954 each with a popularity 940 and passion 942. For example, a topic 944 may be "basketball" with multiple terms 954 such as "Michael Jordan", "final eight", etc. In some embodiments, the topic 944 includes a separate passion 942 and/or popularity 940 for the topic 944. In some embodiments, a trend 936 is for terms 954 without a topic 944. The popularity 940 is based on viewing frequency and production frequency. Passion 942 is based on a measure of the interaction with content 902 regarding the term 954 such as an average viewing time of the content 902 by users 904.

The trend 936 may indicate interests of the users 904, memes, slangs, and so forth that may be used to improve the content 902 and/or user 904 experience within the messaging system 100. Modification extraction module 910 is disclosed in conjunction with FIG. 13. Content consumption metrics extraction module 912 is disclosed in conjunction with FIG. 16. User metadata collection module 914 is disclosed in conjunction with FIG. 17. Data filtering and aggregation system 922 is disclosed in conjunction with FIG. 18. Calculate statistics module 930, trend analysis module 932, and correlation analysis module 934 are disclosed in conjunction with FIG. 19. Produce content module 946, produce modification module 948, produce marketing and sales reports module 950, determine external events module 952, and recommend content module 956 are disclosed in conjunction with FIG. 24.

Figure 10:
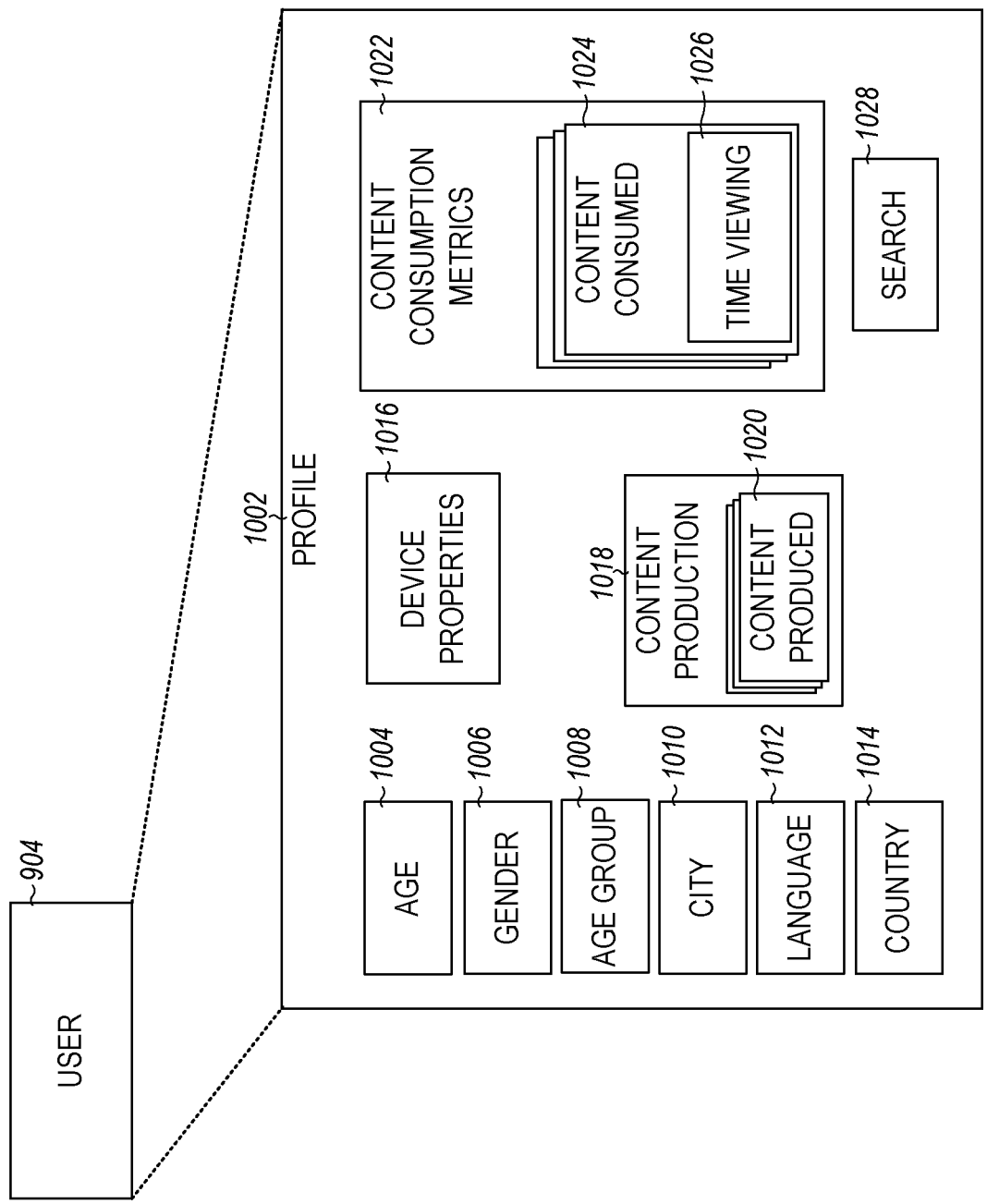
FIG. 10 illustrates users, in accordance with some embodiments.

FIG. 10 illustrates users 904, in accordance with some embodiments. Users 904 may include profile 1002, age 1004, gender 1006, age group 1008, city 1010, language 1012, country 1014, device properties 1016, content production 1018, content produced 1020, content consumption metrics 1022, content consumed 1024, time viewing 1026, and search 1028.

Age 1004 is the age or an age range of the user 904. Gender 1006 is an indication of a gender of the user 904. Age group 1008 is an indication of an age group of the user 904 such as 18-24 years old and so forth. City 1010 is an indication of a city the user 904 resides in, works in, or is associated with. Language 1012 is an indication of a human natural language used by the user 904 within the messaging system 100. Country 1014 is an indication of a country associated with the user 904 such as a country 1014 in which the user 904 resides. Device properties 1016 is properties of one or more devices the user 904 uses including the device the user 904 uses to access the messaging system 100. Content production 1018 is data regarding the content 902 the user 904 has produced 906. The data may include indications of the content produced 1020, which may include modifications used by the user 904, topics 944 of the content produced 1020, terms 954 of the content produced, which other users 904 was the content produced 1020 sent to, whether the content produced 1020 was made public, whether the content produced 1020 was part of an ephemeral message, and so forth.

Content consumption metrics 1022 includes data regarding content consumed 908 by the user 904. Content consumption metrics 1022 may include an indication of the content consumed 1024 and a time viewing 1026 the content. The data may include interactions the user 904 had with the content consumed 1024 such as whether the user 904 responded to the content 902, viewed the content 902 multiple times, liked the content 902, and so forth. Search 1028 indicates search 1028 that have been performed by the user 904. In some embodiments, there may be more than one of one or more of the fields such as city 1010, language 1012, and so forth.

Figure 11:
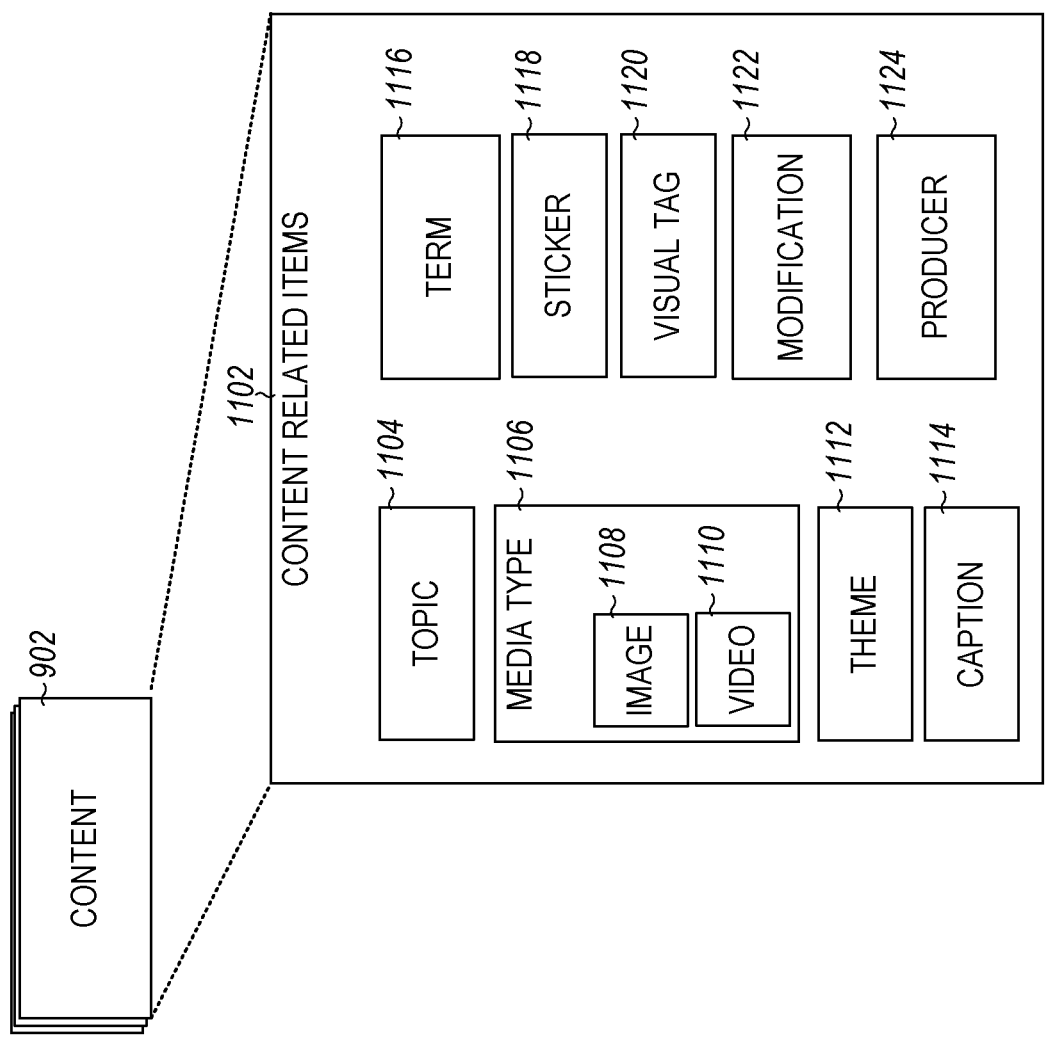
FIG. 11 illustrates content, in accordance with some embodiments.

FIG. 11 illustrates content 902, in accordance with some embodiments. Content 902 may include content related items 1102, topic 1104, media type 1106, image 1108, video 1110, themes 1112, captions 1114, term 1116, stickers 1118, visual tags 1120, and modification 1122. Topic 1104 may be a topic that is determined to be relevant for the content 902. Topic 1104, theme 1112, and term 1116 may be selected by the producer 1124 of the content 902 or it may be determined by the system 900. Media type 1106 indicates a type of media for the content 902. Media type 1106 includes image 1108, video 1110, and so forth. Caption 1114 is one or more captions that have been added to the content 902. Sticker 1118 is a modification item that may be added to the content 902. Visual tag 1120 is a name for an object that has been determined by the system 900. In some embodiments, the producer 1124 of the content 902 may give a visual tag 1120 to an object in the content 902. Modification 1122 indicates one or more modification items have been added to the content 902 as provided by the augmentation system 206. Producer 1124 is the producer of the content 902. The producer 1124 may be the user 904, system 900, or another system of the messaging system 100. For example, in some embodiments external news stories are generated by the messaging system 100 and made available as content 902. Content related items 1102 may include additional items such as an indication of users 904 that have consumed the content 902. In some embodiments, there may be more than one of one or more of the fields such as topic 1104, term 1116, and so forth.

Figure 12:
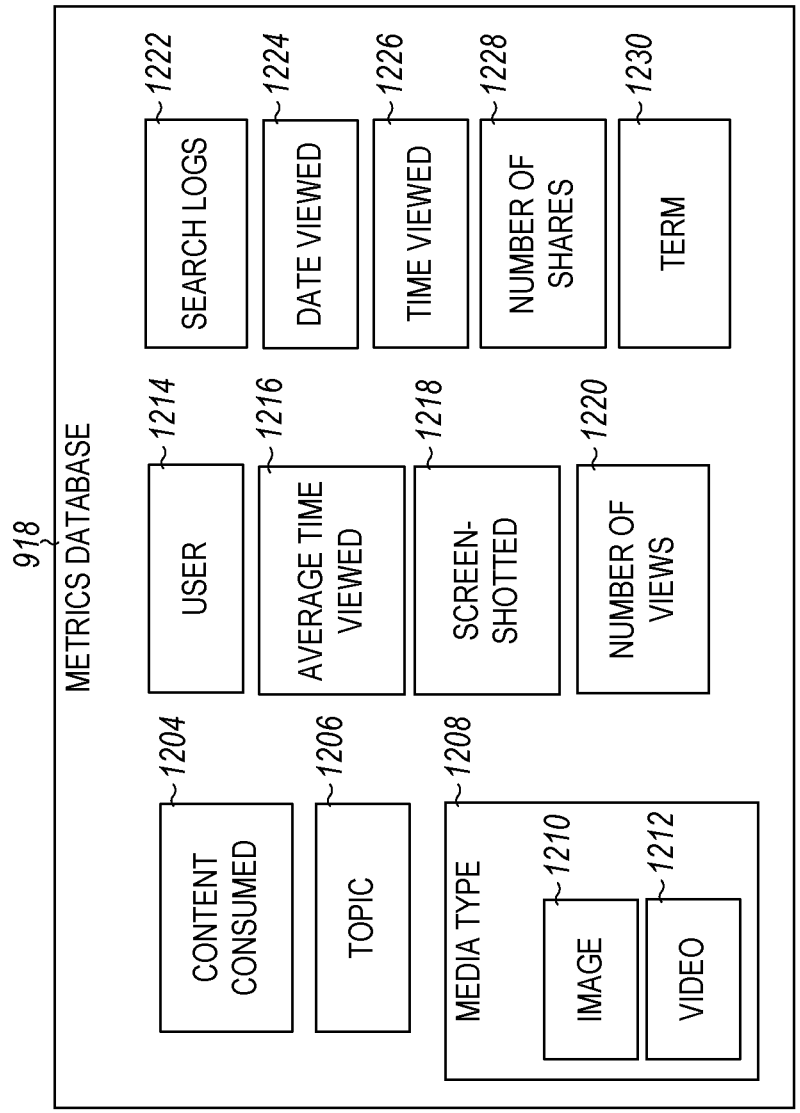
FIG. 12 illustrates the metrics database, in accordance with some embodiments.

FIG. 12 illustrates the metrics database 918, in accordance with some embodiments. The metrics database 918 includes content consumed 1204, topic 1206, media type 1208, image 1210, video 1212, user 1214, average time viewed 1216, screenshotted 1218, number of views 1220, search logs 1222, date viewed 1224, time viewed 1226, number of shares 1228, term 1230. There may be other metrics used by content consumption metrics extraction module 912 to generate metrics database 918. The metrics database 918 may be organized in accordance with schema 1626 of FIG. 16. Content consumed 1204 is an indication of the content 902. Topic 1206 is a topic 944 of FIG. 9 that the content consumed 1204 is categorized as. In some embodiments, topic 1206 may be the same or similar as topic 944. Term 1230 may be the same or similar as term 954. Media type 1208 indicates a type of media of the content consumed 1204 such as image 1210, video 1212, search logs, and so forth. User 1214 indicates one or more users 904 that consumed the content consumed 1204. Average time viewed 1216 indicates an average time user 1214 spent viewing the content consumed 1204. Screenshotted 1218 indicates a number of times or average number of times the content consumed 1204 was screenshotted 1218. Number of views 1220 indicates a number of views of the content consumed 1204. Search logs 1222 indicates a number of times that content consumed 1204 appeared in searches and/or a number of times the content consumed 1204 was selected from searches. Date viewed 1224 indicates a time window 938 for the statistics regarding the content consumed 1204. Time viewed 1226 indicates one or more statistics regarding the viewing of the content consumed 1204 by one or more users 1214. Number of shares 1228 indicates statistics regarding a number of shares of content consumed 1204 by one or more users 1214. It will be appreciated that metrics database 918 may include additional metrics regarding the content consumed 1204 by one or more users 1214.

Figure 13:
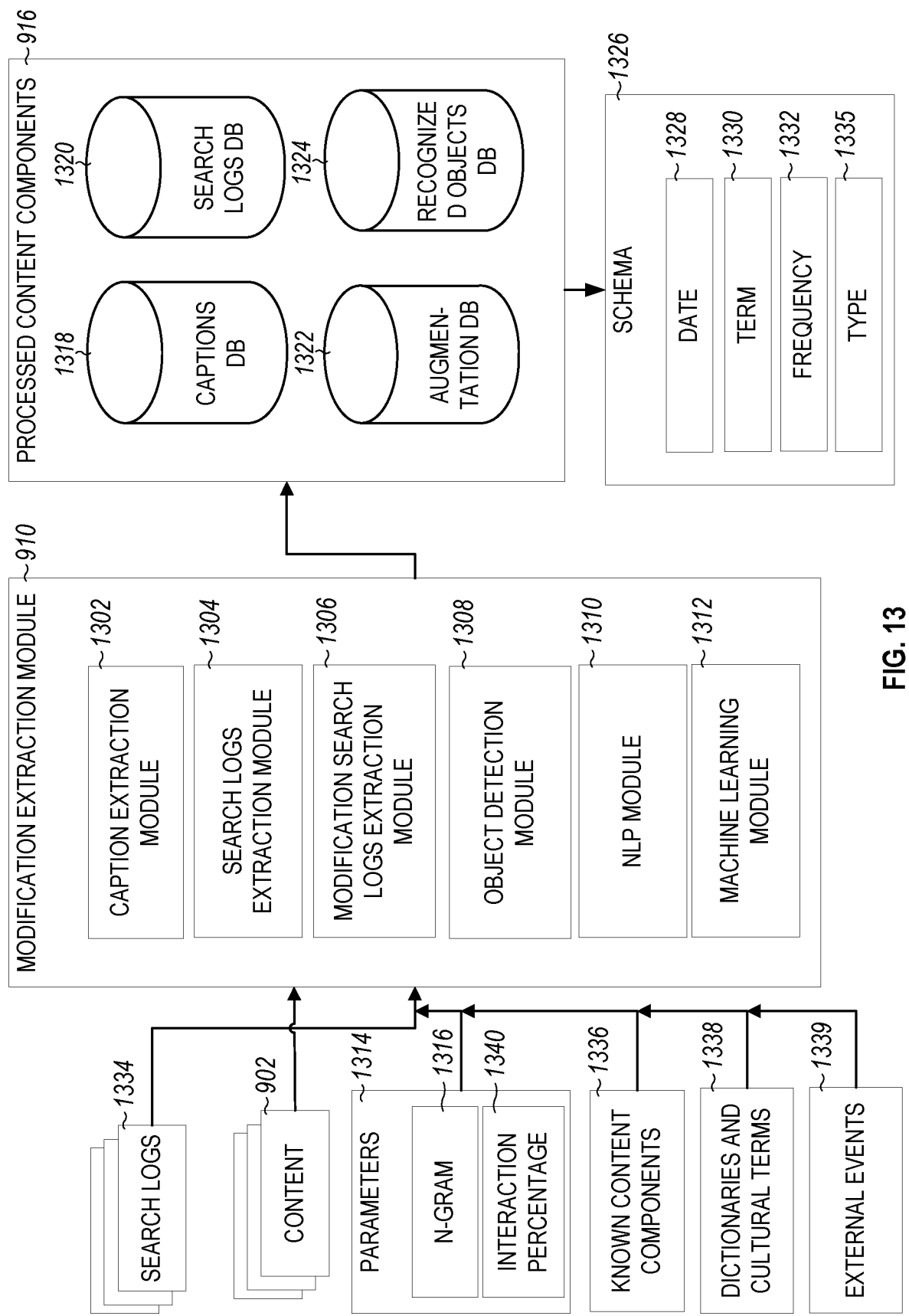
FIG. 13 illustrates modification extraction module, in accordance with some embodiments.
Figure 14:
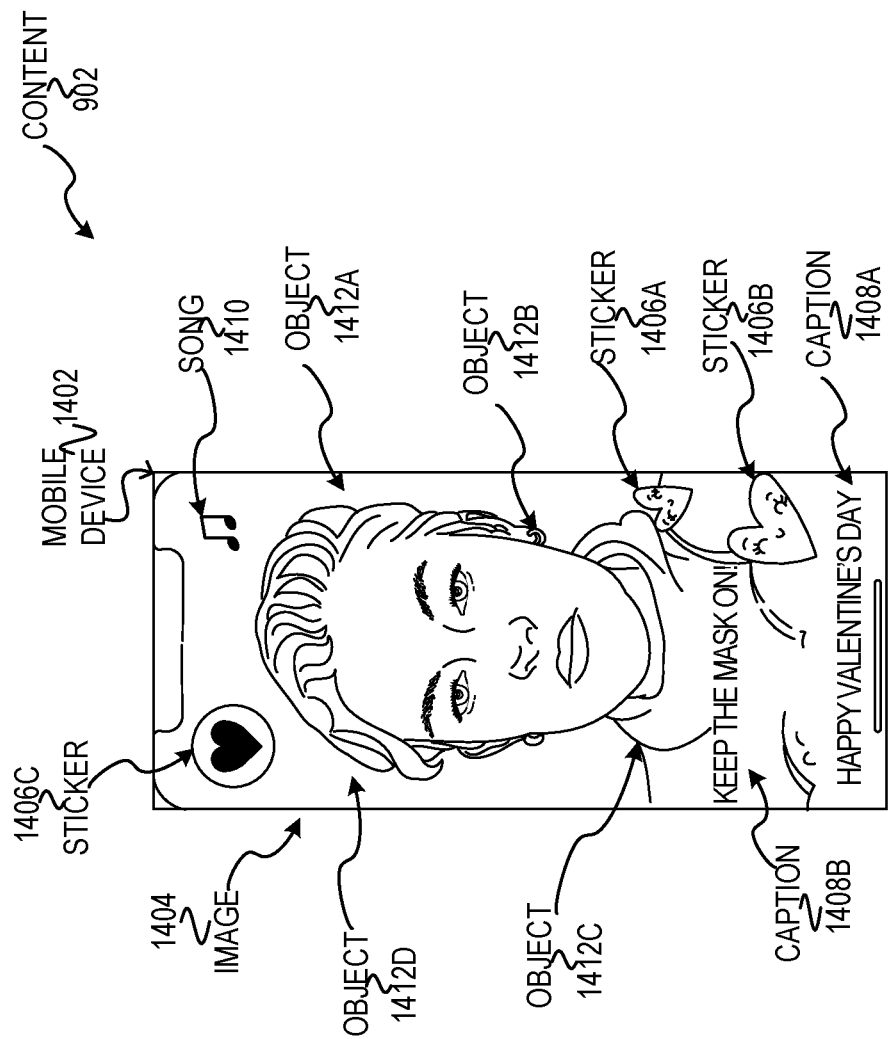
FIG. 14 illustrates content, in accordance with some embodiments.
Figure 15:
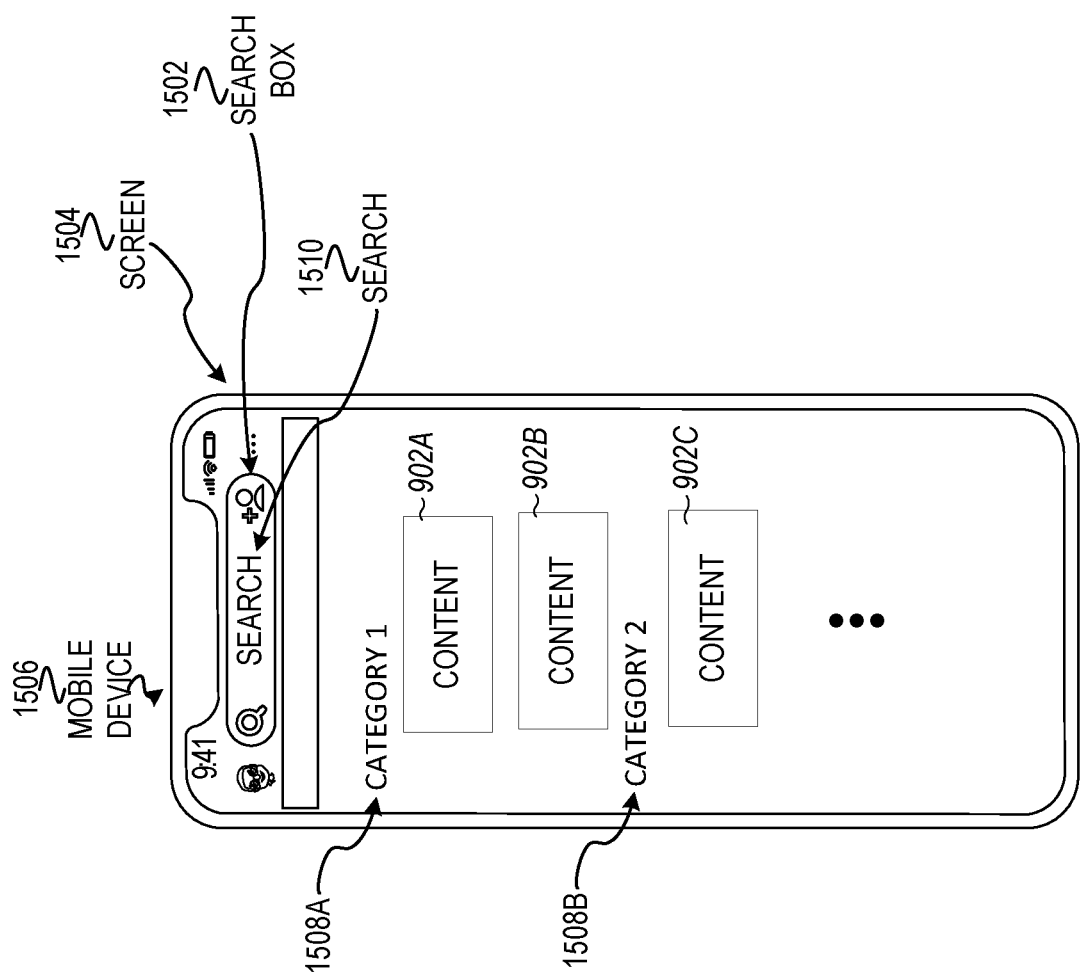
FIG. 15 illustrates a search, in accordance with some embodiments.

FIG. 13 illustrates modification extraction module 910, in accordance with some embodiments. FIG. 14 illustrates content 902, in accordance with some embodiments. FIG. 15 illustrates a search 1510, in accordance with some embodiments. FIGS. 13, 14, and 15 are disclosed in conjunction with one another.

Modification extraction module 910 examines the search logs 1334 and content 902 and uses the parameters 1314, known content components 1336, dictionaries and cultural terms 1338, and external events 1339 to generate processed content components 916, which may include captions DB 1318, search logs DB 1320, modification DB 1322, and recognized objects DB 1324. Captions DB 1318, search logs DB 1320, modification DB 1322, and recognized objects DB 1324 are organized with a schema 1326 that includes date 1328, term 1330, frequency 1332, type 1335. Term 1330 is one or more words. Frequency 1332 is an indication of how many times the term 1330 was used. The date 1328 may indicate a date range or time window such as second, multiple-second period, minute, hour, multiple-hour period, day, multiple-day period, week, multiple-week period, month, multiple-month period, year, or multiple-year period. Frequency 1332 may be divided into categories such as 1 to 1000, 1000 to 10,000, and so forth. Type 1335 indicates a type of the content 902 such as image, video, and so forth.

Illustrated in FIG. 14 is content 902 displayed on a mobile device 1402. The content 902 is an image 1404 with modifications such as stickers 1406A, 1406B, and 1406C, captions 1408A and 1408B, and song 1410. Objects 1412A, 1412B, 1412C, and 1412D are part of the image 1404 and are detected by the object detection module 1308. Other modifications may be used. Object 1412A is a person or face and may indicate gender. Object 1412B is an earring. Object 1412C is a sweater. In some embodiments the modifications may be modifications that are added by the messaging server system 108 and stored in a manner that enables the modifications to be identified by modification extraction module 910 from the image 1404. For example, the content 902 may have been generated by the augmentation system 206 as part of a message 400 as illustrated in FIG. 4. The augmentation system 206 may enable the user to add media overlays to the image 1404 such as audio and visual content and visual and sound effects, which may be stored in modification table 310.

Illustrated in FIG. 15 is a screen 1504 of a mobile device 1506 with a search box 1502 that enables users 904 to enter searches. As illustrated the results of a search 1510 are displayed as being divided into category 1 1508A with content 902A and 902B and category 2 1508B with content 902C.

Returning back to FIG. 13, known content components 1336 may be modifications, terms 1330, images 1404, objects 1412, and so forth. Dictionaries and cultural terms 1338 are dictionaries of terms, sentiment mappings from terms to sentiments, cultural terms such TV shows, and so forth. Parameters 1314 includes parameters that are used by the modification extraction module 910. N-Gram 1316 is a number of words in a term 1330. Interaction percentage 1340 is a threshold to use for a percentage of searches with a same term 1330 that led to the user interacting with content 902A, 902B, and 902C that was part of the search results. In some embodiments the number of words in an n-gram 1316 is fixed or has a range such as one to nine words. In some embodiments the n-gram 1316 is learned by NLP module 1310, machine learning module 1312, or another module. Search logs 1334 are logs of searches 1510 performed by users 904 of the messaging server system 108 such as search 1510 and may include an indication of search results and selections that users 904 made from the search results. External events 1339 includes news stories and so forth. External events 1339 may be processed through a machine learning module 1312 or NLP module 1310 to determine a n-gram 1316 for external events 1339. For example, rather than thousands of news stories regarding the coronavirus, a term 1330 may be determined from the news stories such as "coronavirus", "pandemic", "national emergency," and so forth.

Caption extraction module 1302 extracts captions such as caption 1408A, 1408B from the content 902 and stores them in captions DB 1318. Caption extraction module 1302 may determine the caption based on known content components in the augmentation table 310. Caption extraction module 1302 may use the natural language processing (NLP) module 1310 to extract text from the content 902 and to determine the term 1330 to use of the caption. Caption extraction module 1302 only uses n-grams that appear a minimum number of times, which may be a dynamic threshold, or a user entered threshold. For example, a caption such as "Too much work" may be a 3-gram that is only used ten times and a threshold for the frequency 1332 may be 100 times. Based on these numbers, the caption "Too much work" would not be entered in the captions DB 1318. The NLP module 1310 is used to understand the language of the captions. For example, NLP module 1310 may determine a sentiment of a caption, which may become part of the schema 1326. For example, schema 1326 may include a sentiment field. The sentiment may include happy, hopeful, get well, and so forth. In another example, NLP module 1310 detects entities like movies, computer games, and TV series based on comparing the captions to dictionaries and cultural terms 1338, which may include TV series, famous people, current events, countries, cities, restaurants, hair cut styles, and so forth. In another example, NLP module 1310 may extract emojis from the captions and use them as terms 1330. In some embodiments, NLP module 1310 clusters related terms together and merges synonyms into one or more terms 1330. Dictionaries and cultural terms 1338 include a synonym dictionary, in accordance with some embodiments. The caption extraction module 1302 is configured to recognize hashtags. The dictionaries and cultural terms 1338 includes hashtags, in accordance with some embodiments. The term 1330 may be a hashtag.

In some embodiments NLP module 1310 and/or machine learning module 1312 search through search logs 1334 and content 902 for phrases and/or sentences that indicate the content 902 and/or search logs 1334 regard a known content component 1336 such as a movie name or a game name. An example sentence is "I am watching the Avengers." The term 1330 would be "Avengers". In some embodiments NLP module 1310 and/or machine learning module 1312 determine that a part of a sentence or phrase refers to a trend based on its position in the sentence or phrase. For example, if "Avengers" is repeatedly found in the search logs 1332 but not in the known content components 1336, NLP module 1310 and/or machine learning module 1312 may determine that "Avengers" is a new term 1330 that may be trending. In another example, NLP module 1310 and/or machine learning module 1312 determine the type of content 902 based on context. For example, "I like playing Worldend" may indicate that "worldend" is a game based on the verb "playing."

In some embodiments NLP module 1310 and/or machine learning module 1312 use Pointwise Mutual Information to sort candidate terms 1330 to determine a type of the term 1330. For example if "Avengers" appears in some content 902 and search logs 1334 that appear to be directed towards a movie and other content 902 and search logs 1334 that appear to be directed to a game, then NLP module 1310 and/or machine learning module 1312 may use Pointwise Mutual Information to determine which category is the more likely for a specific content 902 reference. Two terms 1330 may be generated one for the movie and one for the game.

Search logs extraction module 1304 may use NLP module 1310 to search for terms 1330 in the search logs 1334. Search logs extraction module 1304 bases the generation of the search logs DB 1320 on n-gram 1316, in accordance with some embodiments. For example, search logs extraction module 1304 may use a predetermined value for n-gram 1316 such as one-gram to nine-gram. In another example, search logs extraction module 1304 may use machine learning module 1312 and/or NLP module 1310 to determine an n-gram 1316 size to use to determine terms 1330. In some embodiments, short search terms such as three-word terms are clustered together with other search terms with similar prefixes. Search logs extraction module 1304 filters out Not Safe For work, "NSFW", content by using a dictionary of commonly used NSFW search terms that may be included in dictionaries and cultural terms 1338. In some embodiments, search logs extraction module 1304 filters out search terms where users interacted with the results of the searches from the search term resulted in less than an interaction percentage 1340 of the users interacting with content 902A, 902B, 902C from the search results. In some embodiments, search logs extraction module 1304 filters out search terms that are determined to be user related such as usernames. The search logs extraction module 1304 is configured to recognize hashtags, in accordance with some embodiments.

The modification search logs extraction module 1306 uses one or more of content 902, parameters 1314, known content components 1336, and external events 1339 to generate modification DB 1322. In some embodiments, the modification search logs extraction module 1306 identifies searches that are for content 902 with known modification data such as stickers 1406A, 1406B, 1406C. In some embodiments, the stickers 1406A, 1406B, 1406C have names or descriptions such as hearts, stars, musical notes, high-five, and so forth. In some embodiments, short sticker search terms such as three letters are clustered together with other sticker searches with similar prefixes and used as a term 1330 for modification DB 1322. The modification search logs extraction module 1306 may use a predetermined value for n-gram 1316 such as one-gram to nine-gram. In another example, the modification search logs extraction module 1306 may use machine learning module 1312 and/or NLP module 1310 to determine a size of an n-gram 1316 to use to determine terms 1330. Modification search logs extraction module 1306 may use known content components 1336 to identify terms 1330 such as modification data. In some embodiments the searches 1510 may include an indication of modification data such as stickers. The modification search logs extraction module 1306 may use the modification data to determine which searches of the search logs 1334 include modification data. The term 1330 may be identified as modification data. In some embodiments, search 1510 may include modification data such as a sticker. The meaning of such a search 1510 is to find content 902 that includes the sticker. The term 1330 may indicate a sticker or other modification data.

The object detection module 1308 uses one or more of content 902, parameters 1314, known content components 1336, dictionaries and culture terms, and external events 1339 to generate recognized objects DB 1324. The object detection module 1308 uses machine learning module 1312 to detect objects such as object 1412A, 1412B, and 1412C. The machine learning module 1312 is trained using deep learning to detect objects in an image 1404 or videos and may assign visual tags to the objects, in accordance with some embodiments. The object detection module 1308 may then use the NLP module 1310 to determine terms 1330 to use for the objects based on n-gram 1316 and the visual tags given the objects by machine learning module 1312. For example, object 1412A may be classified as a person and woman. There may be an approximate age or age range estimation. Object 1412B is determined to be an earring and may be determined to be part of the outfit of the woman. Object 1412C is determined to be clothing of the woman and a sweater. Object 1412D may be a background that is not illustrated and may be a background that indicates the woman is home. In some embodiments, machine learning module 1312 generates a taxonomy with abstraction levels for the objects detected in an image 1404. For example, person may be at a second level of a hierarchy and woman at a third level of the hierarchy. Clothing may be at a second level of a hierarchy and sweater at a third level of the hierarchy. The hierarchy may include predetermined schemas for people and assist in determining a term 1330 for the object or for determining new terms 1330 to use for the content 902.

Figure 16:
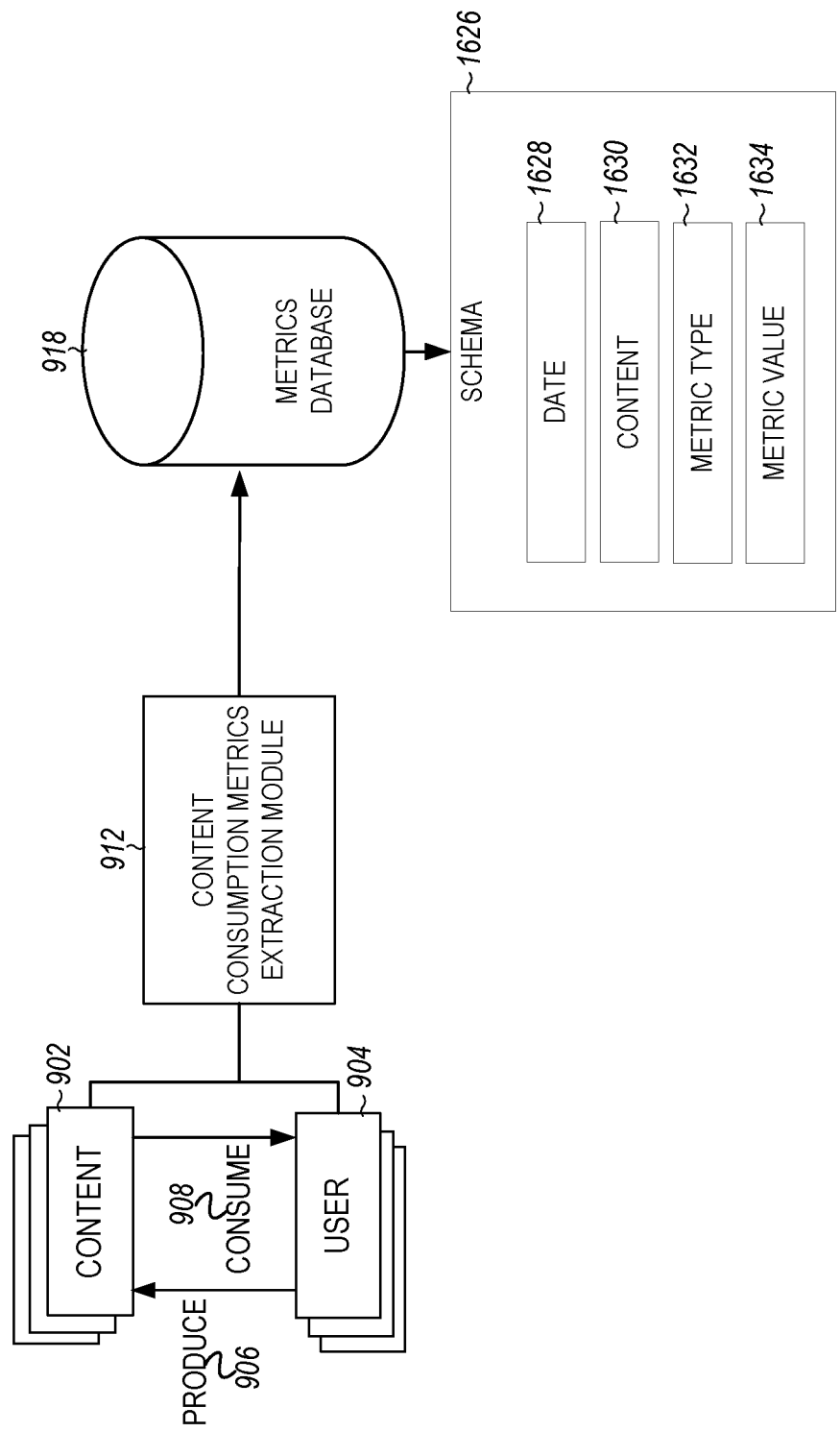
FIG. 16 illustrates content consumption metrics extraction module, in accordance with some embodiments.

FIG. 16 illustrates content consumption metrics extraction module 912, in accordance with some embodiments. The content consumption metrics extraction module 912 uses statistics from one or more of user 904, content 902, produce 906, and consume 908 to generate metrics database 918. Metrics database 918 is organized in accordance with a schema 1626. The schema 1626 may include date 1628, content 1630, metric type 1632, and metric value 1634. The date 1628 may be the same or similar as date 1328 of FIG. 13. Content 1630 may be an indication of content 902. Metric type 1632 includes one or more of the fields disclosed in conjunction with FIG. 12. Metric value 1634 is a value for the corresponding metric type 1632.

Figure 17:
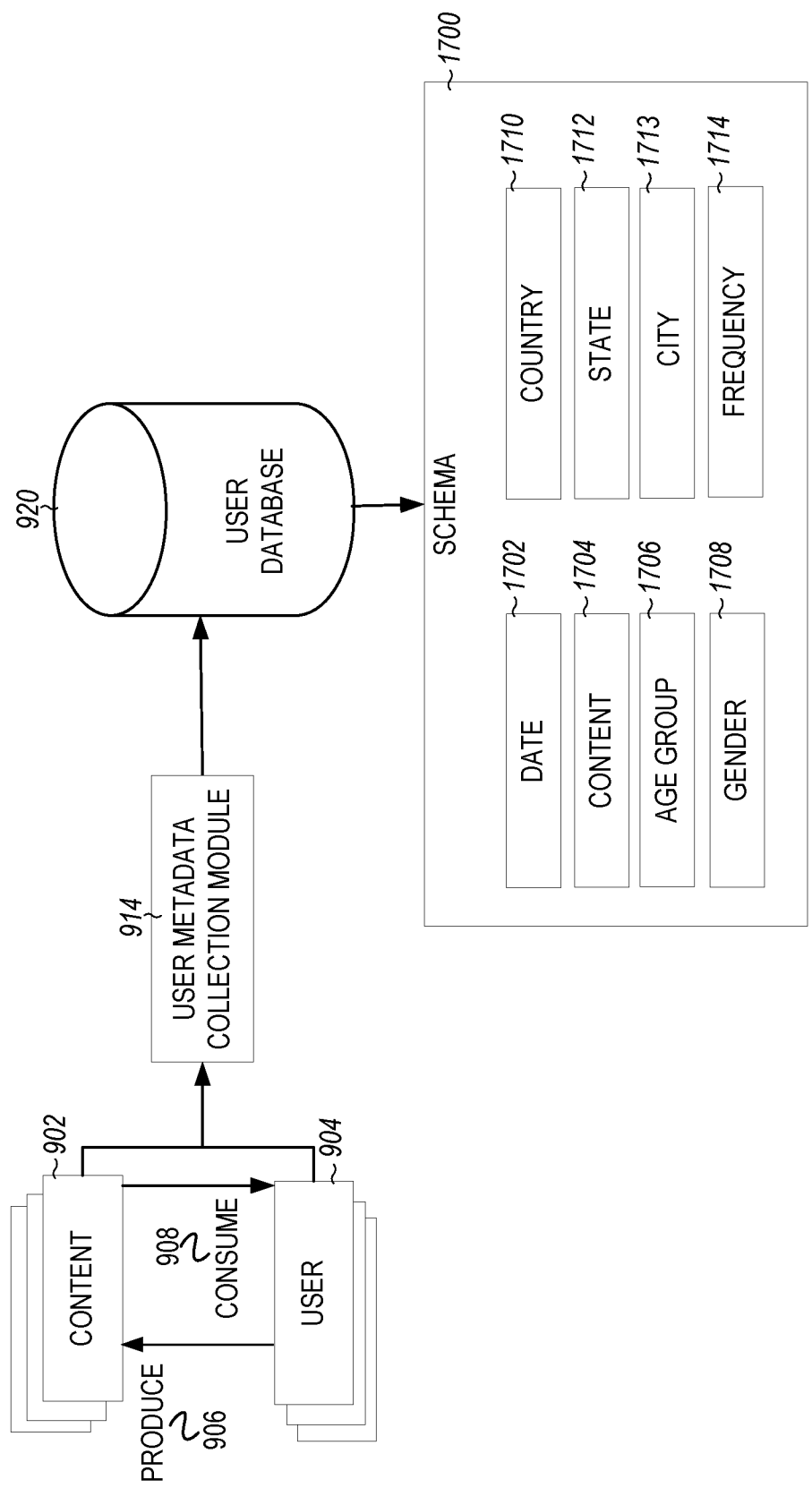
FIG. 17 illustrates user metadata collection module, in accordance with some embodiments.

FIG. 17 illustrates user metadata collection module 914, in accordance with some embodiments. The user metadata collection module 914 uses information from users 904 to generate user database 920 where the user database 920 captures information about users 904. In some embodiments the user database 920 protects the privacy of the users 904. Some of the data associated with users is filtered or not used in the schema 1700. For example, username, address, account identifier, and so forth, are not used in the schema 1700 to protect the privacy of the users 904. The user metadata collection module 914 may determine a number of interactions with content 902 by user 904 based on consume 908 and produce 906.

In some embodiments only users 904 are added to the user database 920 if they have interacted with content 902 a threshold number of times such one or five. The user metadata collection module 914 aggregates the frequency 1714 of interactions of users 904 with content 1704 based for a date 1702 where the aggregation is based on one or more of: age group 1706, gender 1708, country 1710, state 1712, and/or city 1713. The date 1702 is the same or similar as date 1328.

Figure 18:
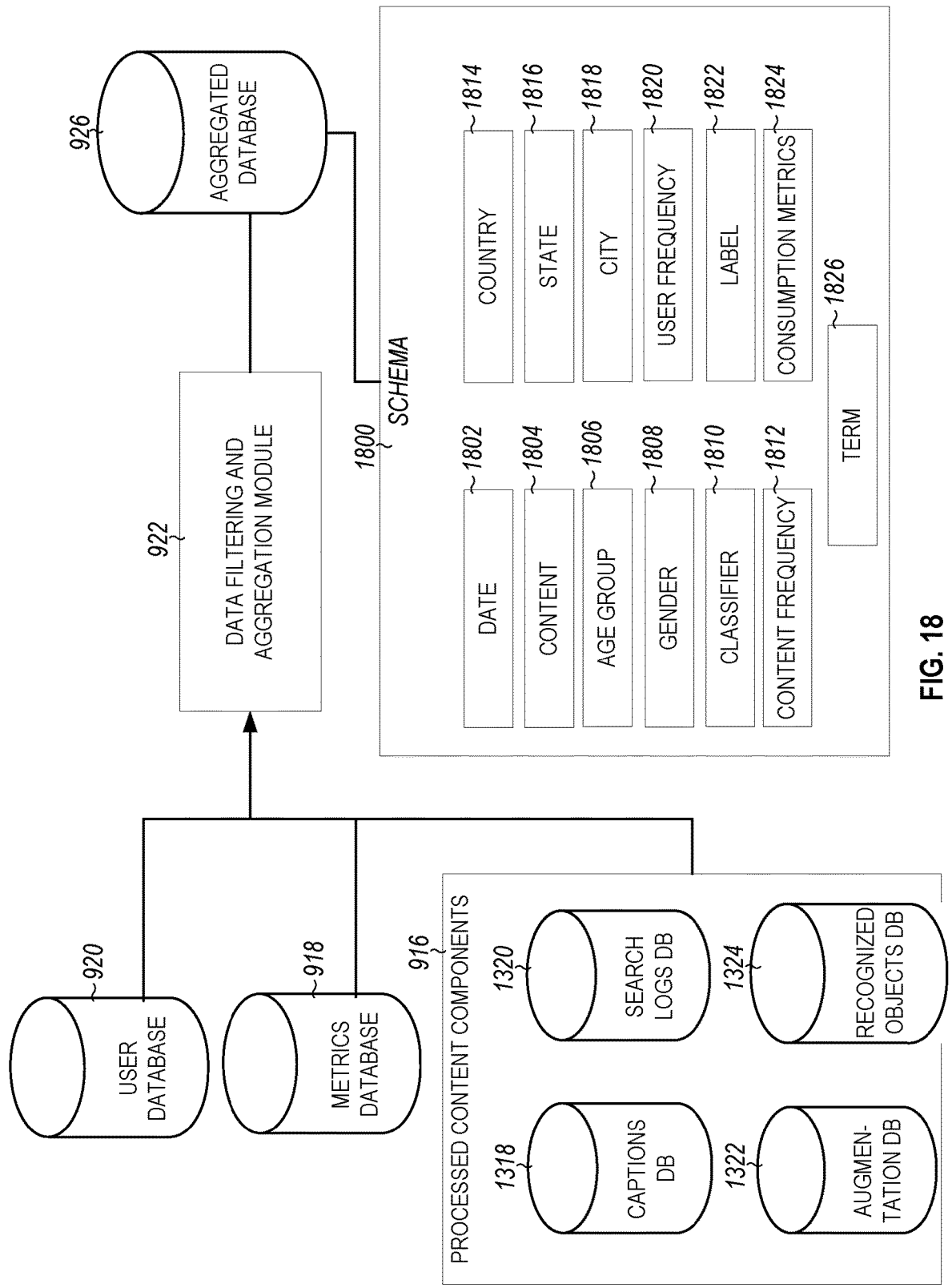
FIG. 18 illustrates data filtering and aggregation system, in accordance with some embodiments.

FIG. 18 illustrates data filtering and aggregation system 922, in accordance with some embodiments. The data filtering and aggregation system 922 takes user database 920 metrics database 918, and processed content components 916 and generates aggregated database 926 with schema 1800. The data filtering and aggregation system 922 filters out low user frequency 1820 with content 1804. The data filtering and aggregation system 922 identifies the content 1804 with the high user frequency 1820 and/or content frequency 1812 and generates schema 1800 for the content 1804. The data filtering and aggregation system 922 normalizes data from user database 920 metrics database 918, and processed content components 916 using in one example embodiment a minimum maximum method. The data filtering and aggregation system 922 normalizes the data with feature scaling so that the magnitude of engagement per topic 944 of FIG. 9 per user is not directly accessible.

The schema 1800 includes one or more of the following: date 1802, content 1804, age group 1806, gender 1808, classifier 1810, content frequency 1812, country 1814, state 1816, city 1818, user frequency 1820, label 1822, consumption metrics 1824, and term 1826. The schema 1800 may include additional fields such as language. Classifier 1810 indicates a type for the content 1804 such as video, image, political topic, health story, pop culture topic, and so forth. Classifier 1810 is the same or similar as type 1335 of FIG. 13. Date 1802 may be the same or similar as date 1328 of FIG. 13.

In some embodiments, the data filtering and aggregation system 922 deletes one or more of user database 920, metrics database 918, and/or processed content components 916 after generating aggregated database 926. The data filtering and aggregation system 922 may delete one or more of the databases to preserve the privacy of the user 904.

Modification extraction module 910 determines term 1330. Content consumption metrics extraction module 912 determines term 1230. Term 1826 may be one or both of term 1230 and/or term 1330 or may be a new term determined by data filtering and aggregation system 922. The system 900 may use other modules to determine term 1230, term 1330, and/or term 1826.

Figure 19:
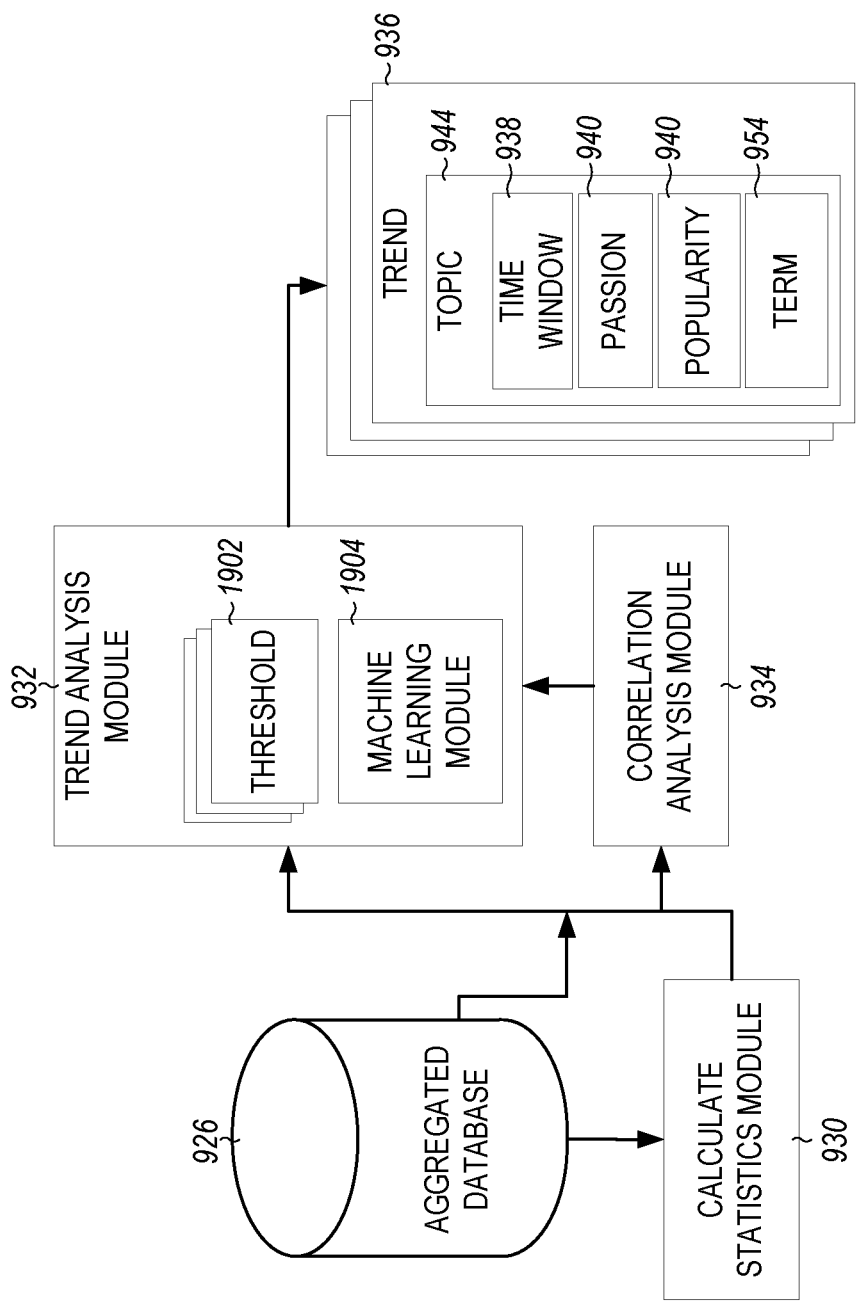
FIG. 19 illustrates trend analysis module and correlation analysis module 934, in accordance with some embodiments.

FIG. 19 illustrates trend analysis module 932 and correlation analysis module 934, in accordance with some embodiments. Trend analysis module 932 is configured to generate trend 936 based on aggregated database 926, the output of calculate statistics module 930, and the output of correlation analysis module 934.

Figure 20:
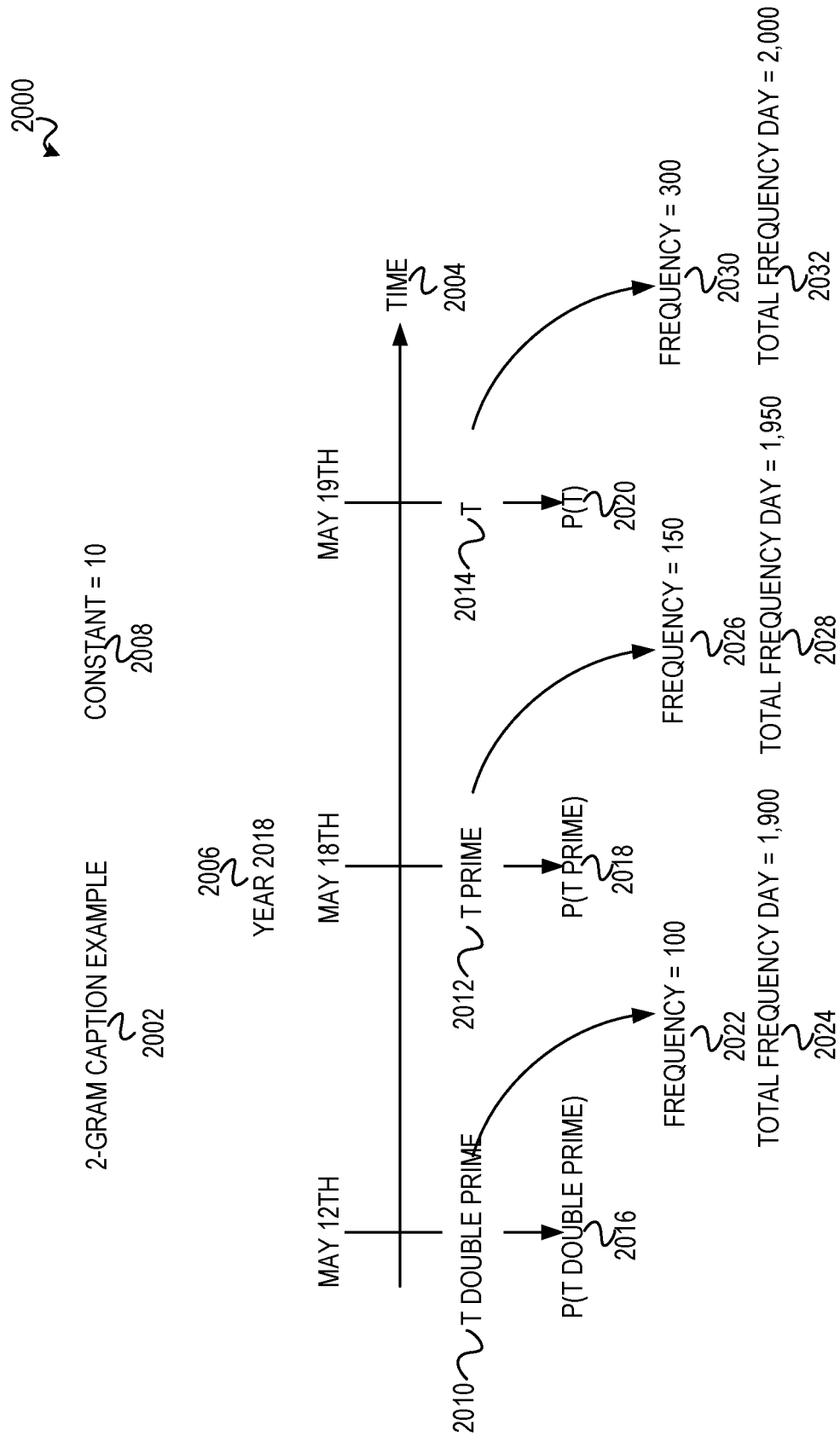
FIG. 20 illustrates an example of the operation of trend analysis module, in accordance with some embodiments.
Figure 21:
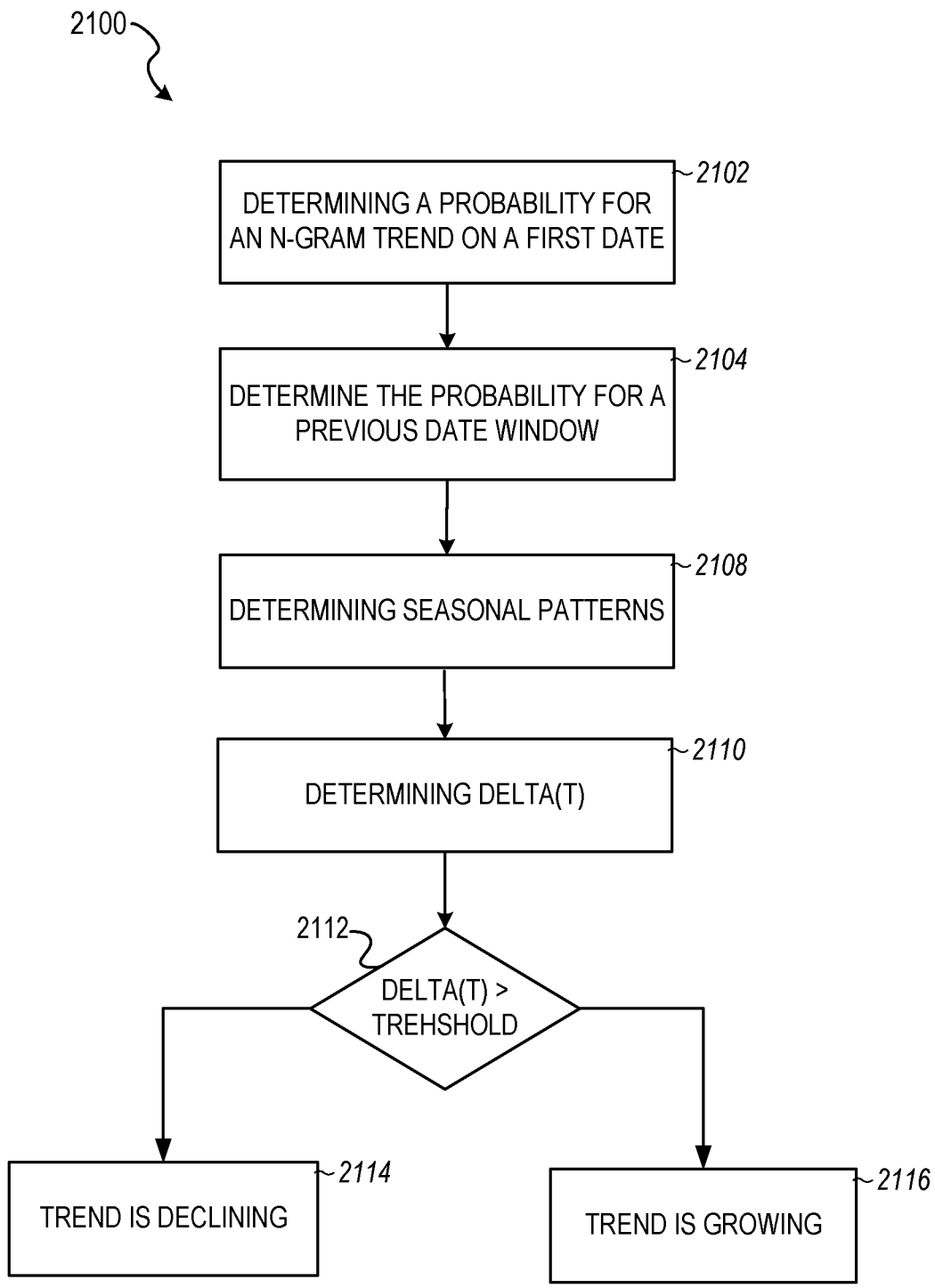
FIG. 21 illustrates a method of trend analysis of textual and visual content, in accordance with some embodiments.
Figure 22:
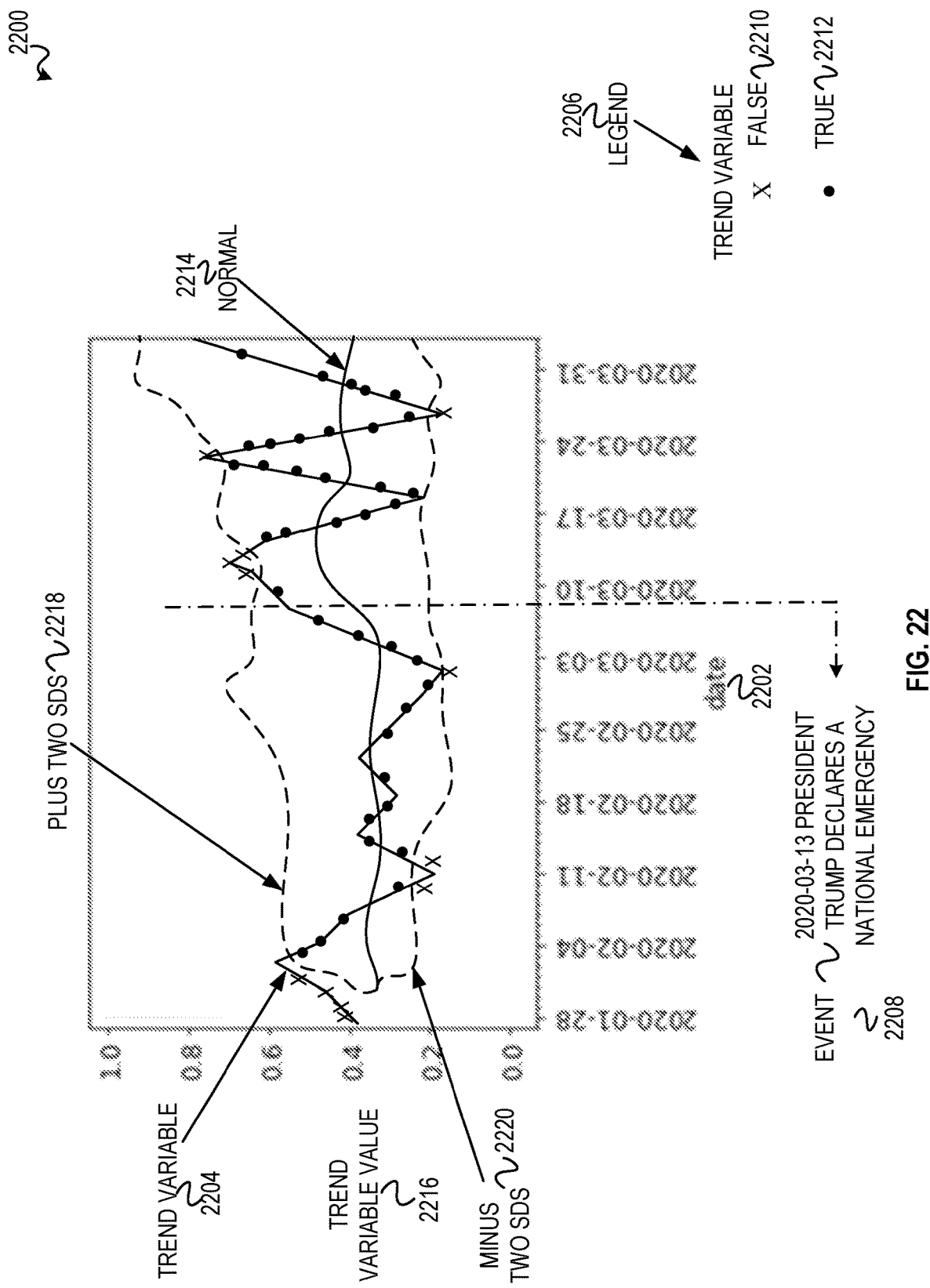
FIG. 22 illustrates the operation of trend analysis module, in accordance with some embodiments.

FIG. 20 illustrates an example 2000 of the operation of trend analysis module 932, in accordance with some embodiments. FIG. 21 illustrates a method 2100 of trend analysis of textual and visual content, in accordance with some embodiments. FIG. 22 illustrates the operation of trend analysis module 932, in accordance with some embodiments. FIGS. 19-22 are disclosed in conjunction with one another.

Term 954 may be the same as term 1826 of aggregated database 926 or trend analysis module 932 may determine a new value for term 954. The system 900 may use other modules to determine term 954.

In some embodiments, the metric type 1632 and metric values 1634 are used to determine a popularity and passion by trend analysis module 932. For example, trend analysis module 932 is configured to use one or more of the equations disclosed herein to determine a popularity or passion. Equation (1): $W=\{w(1), w(2), \ldots, w(n)\}$, where W is a vector of weights and $w(n)$ is the nth weight. Equation (2): $M=\{m(1), m(2), \ldots, m(n)\}$, M is a vector of metrics for content and $m(n)$ is the nth metric. The nth metric has a metric type 1632 and metric value 1634. Equation (3): $Score=w(1)*m(1)+w(2)*m(2) \ldots +w(n)*m(n)$, where the score can correspond to the popularity 940 or the passion 942 of a term 954 for a time window 938 and topic 944.

The weights W may change according to whether a passion or popularity is desired for the score of Equation (3). In some embodiments the weights, W, are predetermined. In some embodiments the weight W can be entered by a user. In some embodiments the weights W are determined by a ML module. For example, machine learning module 1904 may use past data that includes indications of content 902 identified as popular 940 and content 902 for which the users have passion 942. The machine learning module 1904 may learn which weights of W are most relevant for determining a score for popular 940 and a score for passion 942. The machine learning module 1904 may use neural networks, a type of regression such as logistic regression, or another learning technique to learn weights W for determining a score using Equation (1) for popular 940 and learn weights W for determining a score using Equation (1) to determine a score for passion 942.

In the example of FIG. 20, time 2004 progresses left to right and T is equal to the topic 944 or term 954 of "Royal Wedding" on the date of May 19th in the year 2018, which is element 2006. Method 2100 begins at operation 2102 with determining a probability for a n-gram trend on a first date. For example, referring to FIG. 20, which illustrates a 2-gram caption example 2002, P(T) 2020 is determined using Equation (4).

Equation (4): $P(T)=(frequency+constant)/(total\ frequency\ day+constant)$, where the frequency is the frequency of T in content, the total frequency day is the frequency of all content, and the constant is constant that may be determined by machine learning module 1904 or predetermined.

Using Equation (4) and the example of FIG. 20, for P(T 2014) 2020, frequency (element 2030)=300, constant (element 2008)=10, and total frequency day (element 2032)=2,000. Applying the numbers to Equation (4) provides that $P(T)=(300+10)/(2,000+10)$, which is equal to 0.1542.

The method 2100 continues at operation 2104 with determining the probability for a previous date window. P(T prime 2012) 2018 is a previous date window where the window here is a day. Again, using Equation (4) and the example of FIG. 20, for T(W prime) 2018, frequency (element 2026)=150, constant (element 2008)=10, and total frequency day (element 2028)=1,950. Applying the numbers to Equation (4) provides that P(T prime)=(150+10)/(1,950+10), which is equal to 0.0816. In method 2100 the date may refer to a range of dates.

The method 2100 continues at operation 2108 with determining seasonal patterns. For example, P(T double prime 2010) 2016 is May 12th, which is one week before May 19th. The time window is seven days in this example. In some embodiments different time windows are used and the results of using different time windows are compared. Again, using Equation (4) and the example of FIG. 20 for P(T double prime) 2016, frequency (element 2022)=100, constant (element 2008)=10, and total frequency day (element 2024)=1,900. Applying the numbers to Equation (4) provides that P(T double prime)=(100+10)/(1,900+10), which is equal to 0.0576.

The method 2100 continues at operation 2110 with determining delta(T). Delta(T) may be determined using Equation (5), in accordance with some embodiments. Equation (5): Delta(T)=P(T)/Max (P(T prime), P(T double prime)), where Max indicates the maximum of the two numbers. Applying Equation (5) to the example of FIG. 20 provides Delta (T)=0.1542/Max (0.0816, 0.0576); therefore, Delta (T)=1.89.

The method 2100 continues at operation 2112 with determining whether delta(T) is greater than a threshold. In some embodiments threshold 1902 is equal to one. Delta(T) is equal to 1.89, which is greater than one, so the method 2100 indicates the trend is growing 2116. Had Delta(W) been less than the threshold 1902, then the method 2100 would indicate the trend is declining 2114.

A trend 936 includes topic 944 which includes time window 938, passion 942, popularity 940, and term 954. The time window 938 may determine the time window in which the trend 936 is considered. Some example time windows 938 include hourly, daily, weekly, monthly, and so forth as disclosed herein. The topic 944 may be a topic such as sports, pop culture, movies, bloggers, and so forth as disclosed herein. The term 954 may be an n-gram as disclosed herein such as n-gram 1316. The popularity 940 and passion 942 may be determined as disclosed in conjunction with method 2100 and as disclosed herein such as with Equations (1-3) or as disclosed in conjunction with FIG. 22.

In some embodiments, the passion 942 and/or popularity 940 may be further classified in addition to declining and growing. For example, the popularity 940 or passion 942 may be classified as long-term growing when T was already trending higher during a previous time window and the value of Delta(T) increased in this time window. In another example, the popularity 940 or passion 942 may be classified as a developing trend based on an increase from one time window 938 to the next time window 938 where the threshold 1902 may be below one so that trends 936 that are growing slowly may be identified. In another example, the popularity 940 or passion 942 may be classified as a spike trend when the value of Delta(T) is greater than another threshold 1902 value such as 1.5 or another number greater than one.

In some embodiments method 2100 includes the operation of determining whether a caption includes the n-gram. For example, content 1804 of aggregated database 926 is examined to determine if it includes an n-gram such as "Royal Wedding". Additionally, method 2100 may include excluding n-grams that do not include at least a threshold 1902 of content 1804 items that include the n-gram where the threshold 1902 is a number such as 30, 40, 50, or more. In some embodiments the threshold 1902 for excluding n-grams may be dynamic. For example, the threshold 1902 may be determined based on determining a top percentage of trends 936 or a top number of trends 936. Equation (4) may be modified to include a time of engagement of the content 902 by the users.

One or more of the operations of method 2100 may be optional. Method 2100 may include one or more additional operations. The operations of method 2100 may be performed in a different order, in accordance with some embodiments.

Illustrated in FIG. 22 is a graph 2200 plotting trend variable (TV) value 2216 for dates 2202 where the TV 2204 is determined for engagement with content 902 that has visual tags with a topic 944 of "impeachment." TV value 2216 may be for a topic 944 rather than a term 954. Normal 2214 is determined as a normal for TV 2204. In some embodiments, normal 2214 is an average value of TVs for all content 902. In some embodiments, normal 2214 is an average value of TVs for content 902 regarding visual tags. It will be appreciated that normal 2214 may be determined in other ways. Plus two standard deviations (SDS) 2218 is two standard deviations from the normal 2214. Minus two SDS 2220 is negative two standard deviations from the normal 2214.

The legend 2206 indicates categories for TV 2204 as being false 2210 or true 2212. False 2210 indicates the TV 2204 is less than the minus two SDS 2220 or greater than plus two SDS 2218. True 2212 indicates the TV 2204 is not less than the minus two SDS 2220 or greater than plus two SDS 2218. The value of the TV 2204 is determined by Equation (4), in accordance with some embodiments. In some embodiments trend analysis module 932 is configured to use linear regression with least squares to fit a line to the values of the TV 2204. Trend analysis module 932 then determines whether TV 2204 is a trend 936 based on a current value for a time window and past values of the TV 2204.

In some embodiments trend analysis module 932 is configured to use momentum or trend momentum to determine whether the values of the TV 2204 indicate the term 954 of the TV 2204 should be selected as a trend 936. In some embodiments trend analysis module 932 is configured to determine an average and standard deviation of each TV 2204 of trends 936. In some embodiments trend analysis module 932 is configured to determine a common range of all the TVs 2204 as average (TVs)–standard deviation (TVs)<TV<average (TV)+standard deviation (TV). In this way trend analysis module 932 can determine whether a term 954 with TV 2204 should be made a trend 936 based on average (TVs) and standard deviation (TVs). For example, if TV>average (TVs)+2*standard deviation (TVs), then the term 954 may be determined to be a trend 936 for the time window 938 applicable. Additionally, if TV<average (TVs)−2*standard deviation (TVs), then the term 954 may be determined not to be a trend 936 for the time window 938 applicable.

Figure 23:
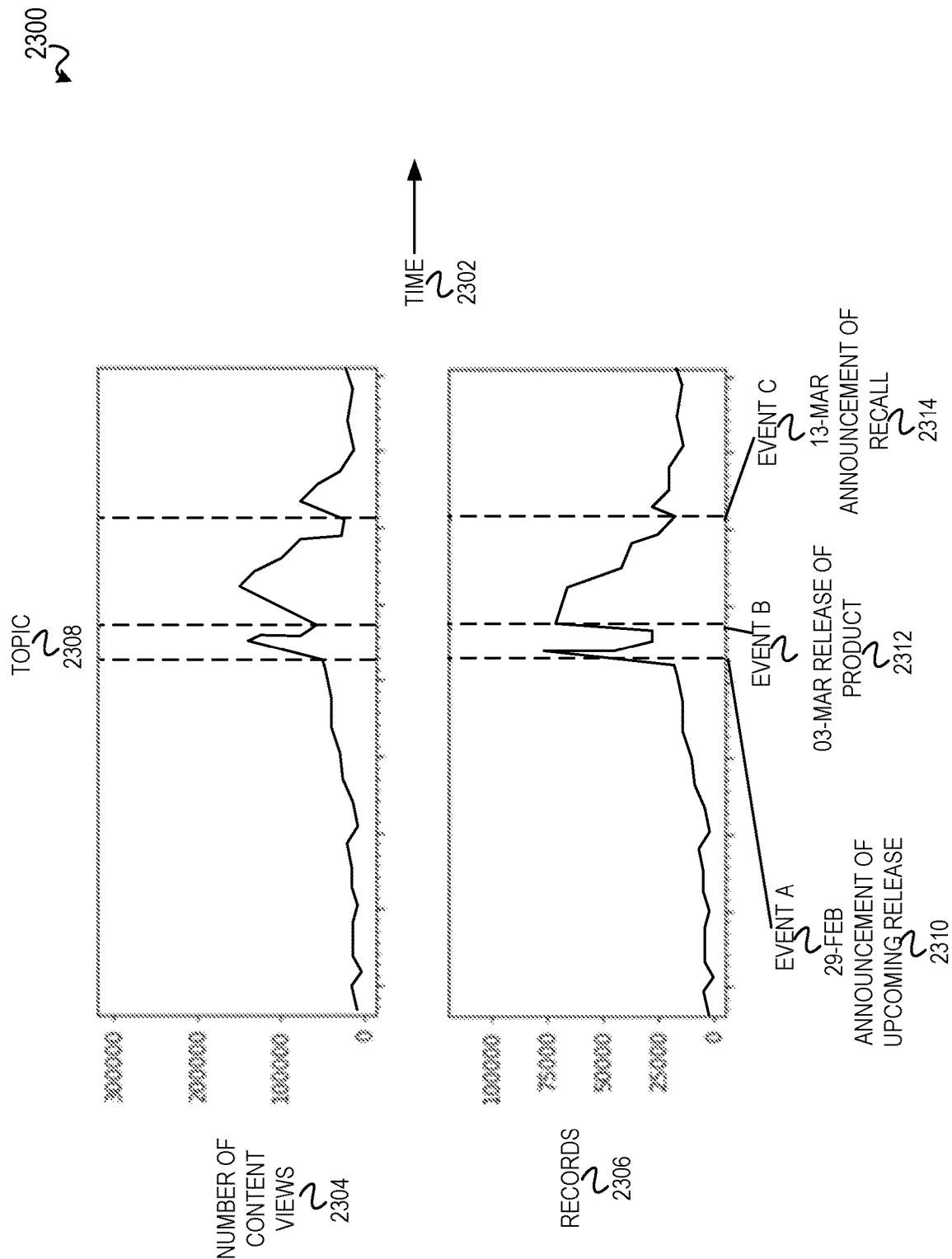
FIG. 23 illustrates an example of engagement of users with a topic and a number of records regarding the topic, in accordance with some embodiments.

In some embodiments trend analysis module 932 and/or correlation analysis module 934 modify Equation (4) to adjust for external events. For example, Equation (6)=P(T)=((frequency+constant)*(external events/nominal external events))/(total frequency day+constant), where the frequency is the frequency of T in content, the total frequency day is the frequency of all content, the constant is constant that may be determined by a machine learning module or predetermined, the external events is a number based on a number of external events that may be weight based on an importance of the external events, and nominal external events is a number that indicates an average or normal number of external events. For example, as illustrated in FIGS. 22 and 23, there may be event 2208 of FIG. 22 or event A 2310, event B 2312, and event C 2314 of FIG. 23. The P(T) of Equation (6) will increase the numerator of Equation (6) when the external events are greater than the nominal external events and decrease the numerator of Equation (6) when the external events are less than the nominal external events. As an example, one may expect that a term 954 such as summer may have a lower frequency during a winter story than during the summer. In some embodiments, Equation (6) may be modified to add in a term to indicate whether the external events would positively affect the term 954 or topic 944 or negatively affect the term 954 or topic 944.

For example, Equation (7)=P(T)=((frequency+constant)*(external events negative correlation/nominal external events negative correlation)*((nominal external events positive correlation/external events positive correlation))/(total frequency day+constant), where the frequency is the frequency of T in content, the total frequency day is the frequency of all content, the constant is constant that may be determined by a machine learning module or predetermined, the external events positive correlation are external events that may increase the frequency, the nominal external events positive correlation are events that may increase the frequency, the external events negative correlation are external events that may decrease the frequency, and nominal external events negative correlation are events that may decrease the frequency.

Correlation analysis module 934 may determine whether content 1804 occurs in more than one portion of the content 1804. For example, a caption 1408A, 1408B of FIG. 14 may include a same n-gram as an object 1412A, 1412B, 1412C, 1412D, song 1410, or sticker 1406A, 1406B, 1406C. Correlation analysis module 934 may indicate this by indicating to trend analysis module 932 that content 1804 may have come from the same content 902. Trend analysis module 932 adjusts the value of the frequency Equations (4-7) based on this correlation. For example, trend analysis module 932, calculate statistics module 930, and/or correlation analysis module 934 may increase or decrease the frequency value for content 1804 of FIG. 18 that originated from the same content 902. For example, the frequency of the content 902 with both a Valentine's heart and a caption that says "Happy Valentine's" may count as more than two for the frequency. In another example, the frequency of the content 902 with 100 Valentine's hearts and a caption of "Happy Valentine's" reduces the frequency of the 100 Valentine's hearts so not to count only one item of content 902 too heavily.

In some embodiments, correlation analysis module 934 correlates two or more items from content 902 or search logs 1334 and determines an n-gram. For example, if the n-gram is an activity, then objects identified as being associated with that activity may be used to determine the n-gram is the activity. For example, if an object is determined to be a horse and another object is a person, then the correlation analysis module 934 may determine the n-gram of horseback riding. In some embodiments, correlation analysis module 934 may determine the n-gram based on known content components 1336. For example, content 902 may include images of beer, beer glasses, wine, wine glasses, and so forth, on a "day to celebrate beer." Correlation analysis module 934 may determine the n-gram for the images of beer to be part of the n-gram "day to celebrate beer."

FIG. 23 illustrates an example 2300 of engagement of users with a topic and a number of records regarding the topic, in accordance with some embodiments. There are two graphs in the example 2300 with time 2302 along a horizontal axis and number of content views 2304 along the vertical axis of the first graph and records 2306 along the vertical axis of the second graph. The topic 2308 is "product X". The number of content views 2304 indicates a number of views of content 902 that have the topic 944 of "product X." Records 2306 indicate a number of events with content 902 regarding "product X." The events may be part of external events 1339, in accordance with some embodiments. In some embodiments, the events are identified by modification extraction module 910, correlation analysis module, and/or trend analysis module 932. Event A 2310, event B 2312, and event C 2314 are example events that are included in content 902 that is produced 906 by a user. Correlation analysis module 934 may group the content 1804 of FIG. 18 that regards events of topic 944 with content 1804 that regards the topic 944. In this way Equation (4) will account for both types of content 1804 in determining a frequency to determine whether or not to select a topic 944 as a trend 936.

Figure 24:
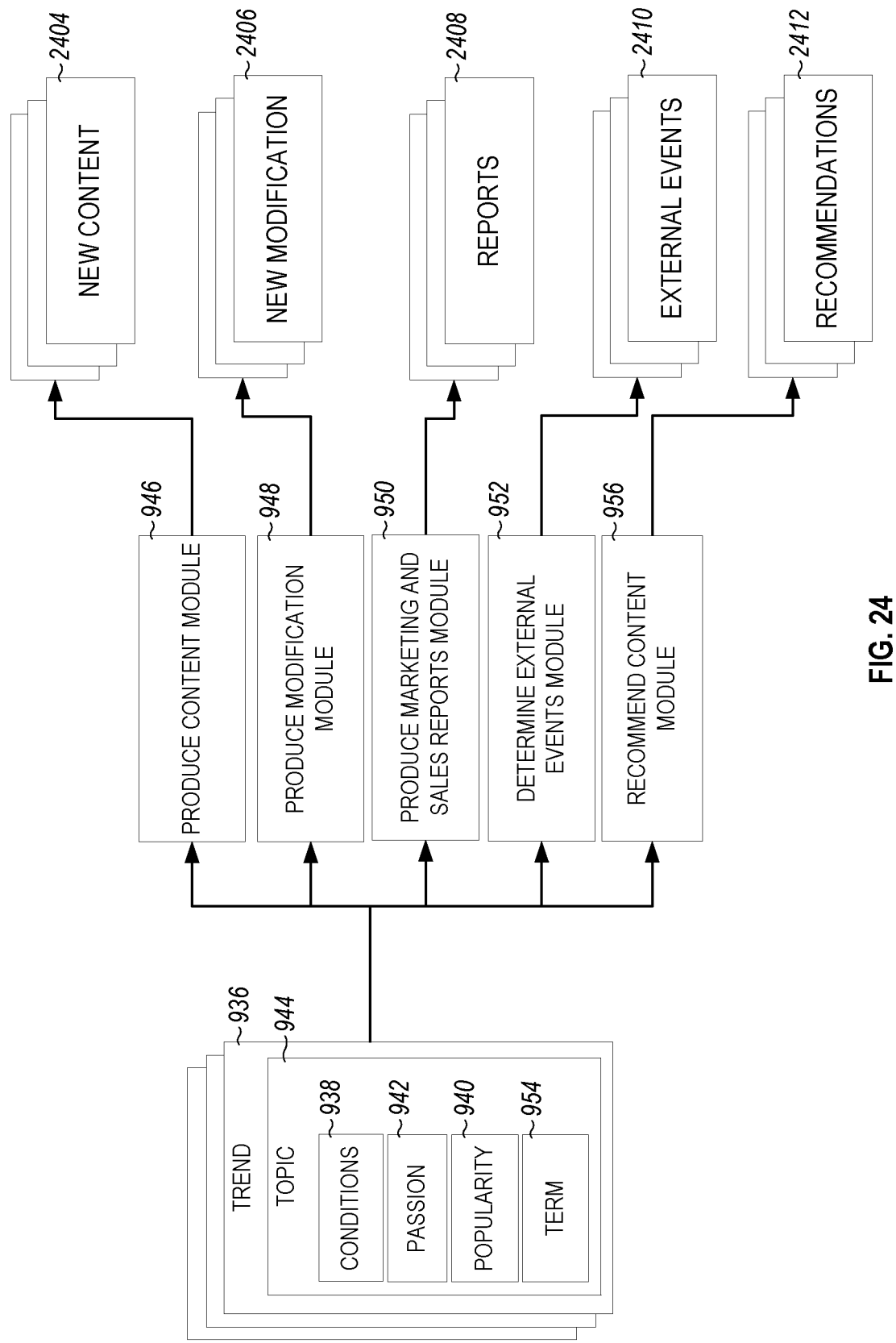
FIG. 24 illustrates the generation of new content, new modification, reports, external events, and recommendations, in accordance with some embodiments.

FIG. 24 illustrates the generation of new content 2404, new modification 2406, reports 2408, external events 2410, and recommendations 2412, in accordance with some embodiments. Produce content module 946 takes trends 936 and generates new content 2404. For example, produce content module 946 may generate content 902 of FIG. 9 based on the topic 944 being underrepresented. In some embodiments, trend analysis module 932 of FIG. 19 determines trends 936 that are underrepresented based on a topic 944 indicating that there are many external events occurring regarding the topic 944 such as news stories and an amount of content 902 is below a threshold 1902 level. In some embodiments, produce content module 946 is configured to generate content 902 that is informative of correct news stories. In some embodiments, produce content module 946 sends a report to human content creators indicating for which topics 944 to generate content 902. Recommend content module 956 may provide recommendations 2412 to users of the messaging system or display content 902 based on the trends 936. Recommendations 2412 may be content 902 that regards the trend 936. Recommendations 2412 be used to recommend topics or terms for users to generate content 902. Recommend content module 956 may select content 902 that is part of the trend 936 based on how popular the content 902 is to all users. Recommend content module 956 may select content 902 for a user based on which users the user has preferred in the past.

Produce modification module 948 is configured to take trends 936 and generate new modification 2406. For example, produce modification module 948 may generate new stickers, captions, and/or songs based on the topics 944 that are trends 936. Produce modification module 948 may generate captions or stickers that are the terms 954 or n-grams. In some embodiments, produce modification module 948 may find images from a database of images available to generate new modification 2406 and find an image that matches the term 954 or topic 944 and put the term 954 together with the image.

Determine external events module 952 is configured to take trends 936 and generate external events 2410. For example, determine external events module 952 may determine that there is a pandemic based on a topic 944 of "coronavirus" being a trend 936 with multiple terms 954 such as "national emergency", "shelter in place", and so forth. In some embodiments, determine external events module 952 may add external events 2410 to external events 1339. In some embodiments, determine external events module 952 may generate possible external events module 952 that are reviewed by humans to identify which of the possible external events module 952 are actual external events module 952.

Figure 25:
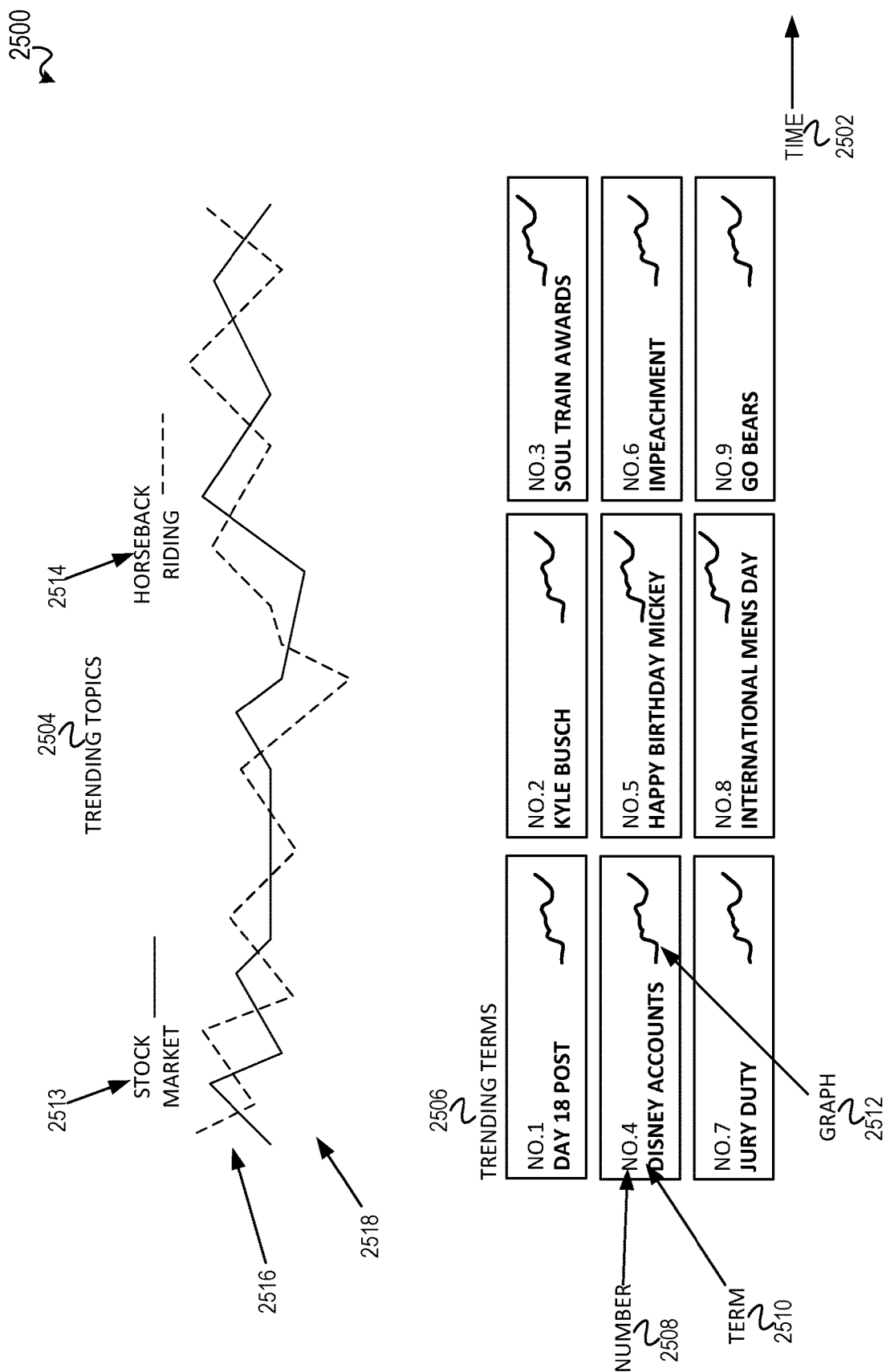
FIG. 25 illustrates an example report, in accordance with some embodiments.

Produce marketing and sales reports module 950 is configured to take trends 936 and generate reports 2408. FIG. 25 illustrates an example report 2500, in accordance with some embodiments. Report 2500 indicates time 2502 along a horizontal axis. Trending topics 2504 illustrates two topics 944 of stock market 2513 with graph 2516 and horseback riding 2514 with graph 2518. Report 2500 further includes nine trending terms 2506. One of the trending terms 2506 has a number 2508 of four, a term 2510 of "Disney accounts", and a graph 2512 that indicates a measure of the frequency for the term 2510 over time. The number 2508 indicates a popularity 940 of the term 954, in accordance with some embodiments. Produce marketing and sales reports module 950 is configured to take trends 936 and generate report 2500. The report 2500 may be used to target advertising to users 904 and to justify advertising rates.

Figure 26:
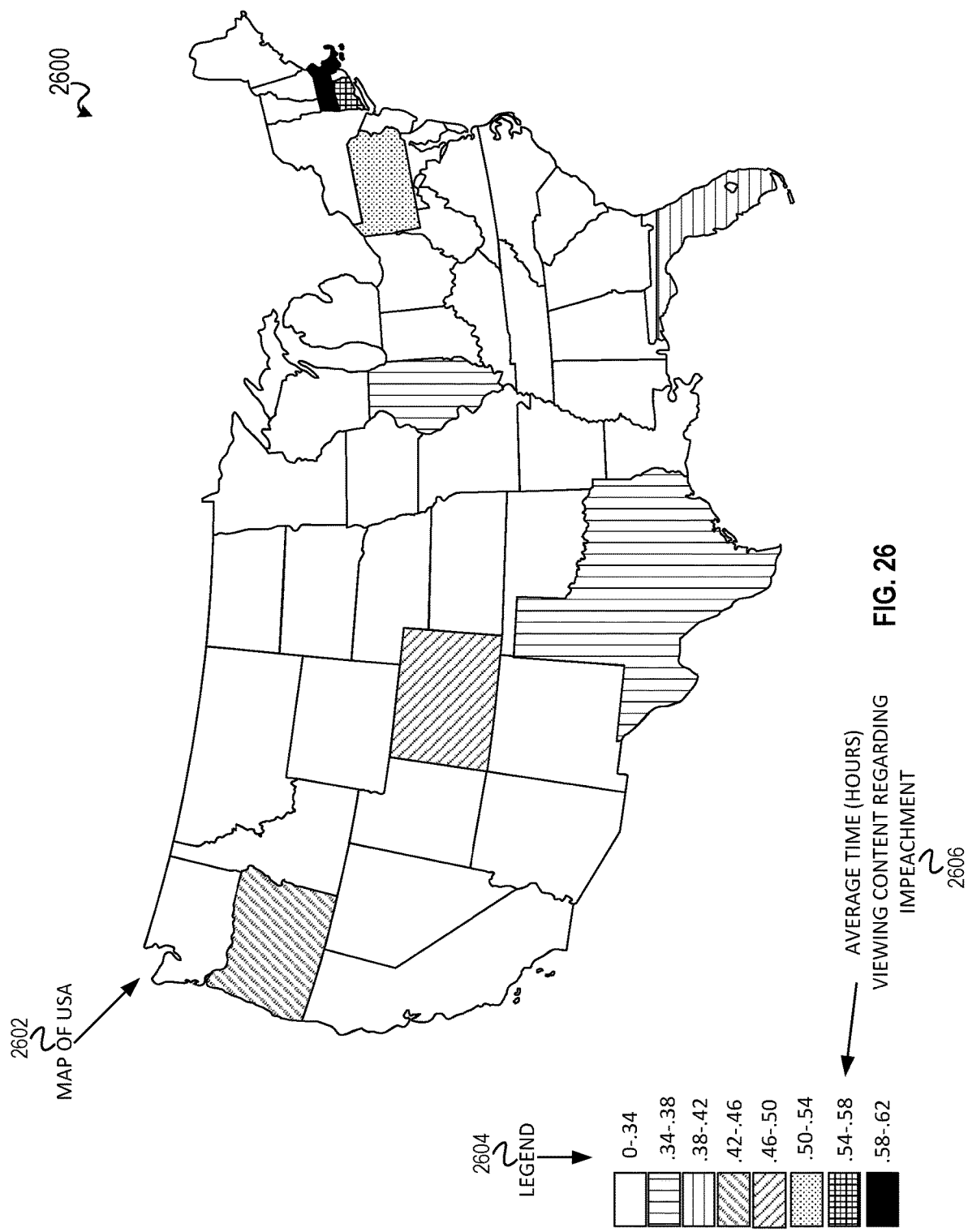
FIG. 26 illustrates an example report, in accordance with some embodiments.

FIG. 26 illustrates an example report 2600, in accordance with some embodiments. Illustrated in FIG. 26 is a map of the USA 2602, legend 2604, which indicates average time viewing content (hours) regarding impeachment 2606. The map of the USA 2602 may be used to determine different interests of people in different geographic regions. Produce marketing and sales reports module 950 is configured to take trends 936 and generate report 2600. Produce marketing and sales reports module 950 is configured to generate additional reports 2408 based on one or more fields of trends 936 and aggregated database 926.

Figure 27:
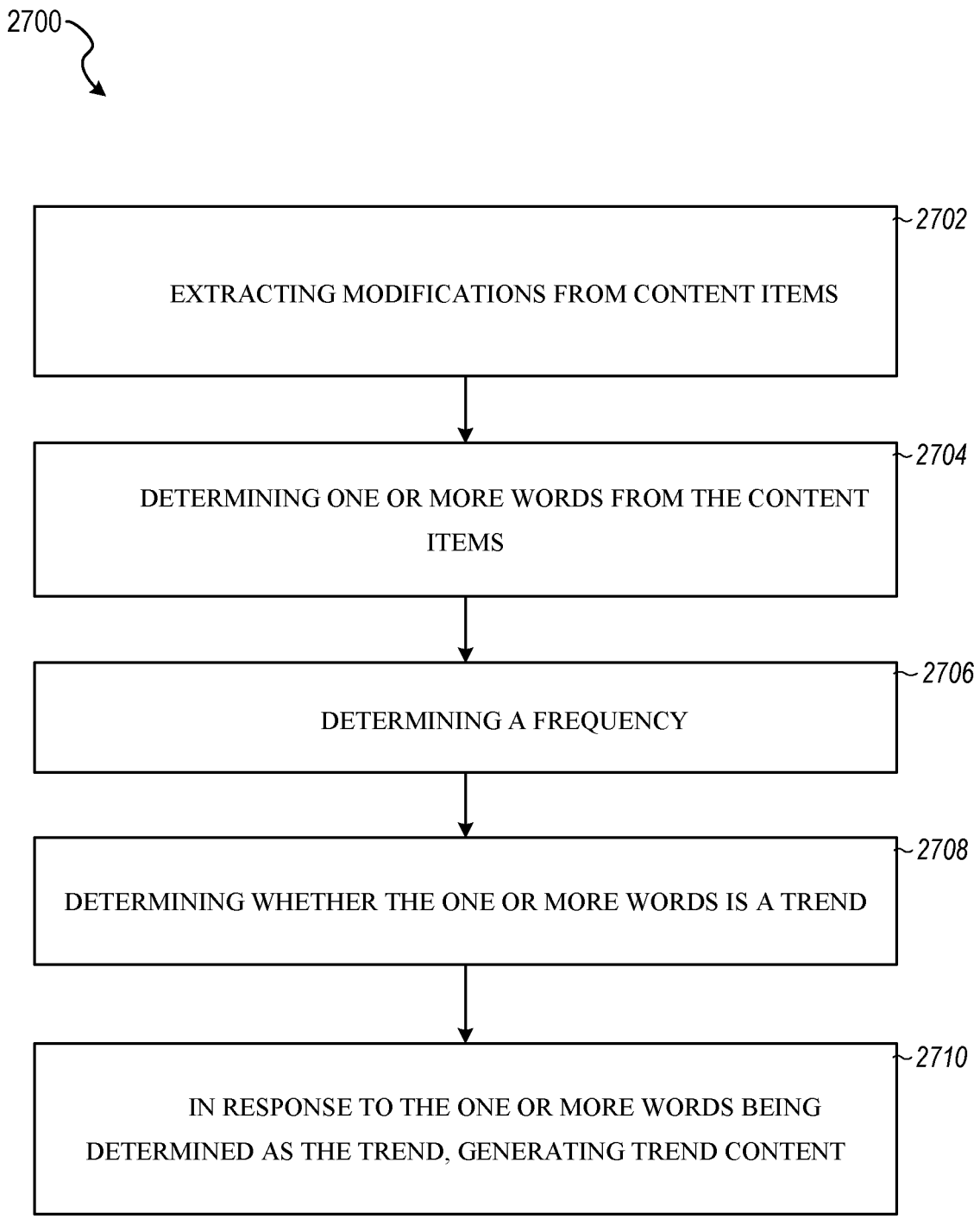
FIG. 27 illustrates a method for trend analysis of textual and visual content, in accordance with some embodiments.

FIG. 27 illustrates a method 2700 for trend analysis of textual and visual content, in accordance with some embodiments. The method 2700 begins at operation 2702 with extracting modifications from content items. In some embodiments operation 2702 includes extracting modifications from content items received from client devices associated with users, the content items being modified using the modifications that comprises a text caption or a media overlay. For example, modification extraction module 910 of FIG. 13 extracts modification content from content 902 such as, referring to FIG. 14, captions 1408A, 1408B, and stickers 1406A, 1406B, 1406C.

The method 2700 continues at operation 2704 with determining one or more words from the content items. In some embodiments operation 2704 includes determining one or more words from the content items and the extracted modifications. For example, referring to FIG. 13, modification extraction module 910 may determine term 1330. In another example, referring to FIG. 16, content consumption metrics extraction module 912 may determine term 1230 of FIG. 12 as a metric type 1632. In another example, referring to FIG. 19, trend analysis module 932 may determine term 954.

The method 2700 continues at operation 2706 with determining a frequency. In some embodiments operation 2706 includes determining a frequency of the one or more words in the content items and the extracted modifications. For example, data filtering and aggregation system 922 may determine content frequency 1812, user frequency 1820, and consumption metrics 1824. In another example, trend analysis module 932, calculate statistics module 930, and correlation analysis module 934 may determine a frequency of the n-gram in the content and modification content in aggregated database 926 as disclosed in conjunction with FIGS. 9 and 19.

The method 2700 continues at operation 2708 with determining whether the one or more words is a trend. In some embodiments operation 2708 includes determining whether the one or more words is a trend based on the frequency and an aggregate frequency. For example, referring to FIG. 19, trend analysis module 932, calculate statistics module 930, and correlation analysis module 934 may determine whether a term 954 is a trend 936.

The method 2700 continues at operation 2710 with in response to the one or more words being determined as the trend, generating trend content. In some embodiments operation 2710 includes in response to the one or more words being determined as the trend, generating trend content associated with the one or more words, the trend content being a text, an image, or an augmentation content. For example, as disclosed in conjunction with FIGS. 9 and 24, produce content module 946 may produce new content 2404. In another example, as disclosed in conjunction with FIGS. 9 and 24, produce modification module 948 may produce new modification 2406.

The method 2700 may optionally include identifying objects within the content items, assigning text labels to the objects, and determining the frequency of the one or more words in the content items, the extracted modification, and the text labels. For example, object detection module 1308 may recognize objects in the content 902 and assign a term 1330 to the object. Data filtering and aggregation system 922 may determine the frequency of the n-gram includes terms 1330 assigned to the objects.

The method 2700 may optionally include determining the one or more words from two or more text labels from the content items, wherein the one or more words are different than the two or more text labels. For example, as disclosed in conjunction with FIG. 13 object detection module 1308 may assign a term 1330 to two or more objects based on an association with text labels such as a person and horse being assigned the term 1330 horseback riding.

The method 2700 optionally includes where the one or more words indicates an activity and wherein the two or more text labels indicate objects associated with the activity. For example, as disclosed in conjunction with FIG. 19 correlation analysis module 934 may determine an n-gram of an activity if objects are identified in content 902 as being associated with that activity such as a person and horse may be used to infer that the n-gram is horseback riding.

The method 2700 optionally includes determining an average amount of time per user of the users spent associated with the content items, wherein determining whether the one or more words is the trend is further based on the average amount of time per user spent associated with the content items. For example, content consumption metrics extraction module 912 may determine an average amount of time per user spent viewing the content comprising the n-gram as a metric type 1632 as disclosed in conjunction with FIGS. 12 and 16. Additionally, as disclosed in conjunction with FIG. 19, trend analysis module 932 may use the aggregated database 926 to determine whether the term 954 is a trend 936.

The method 2700 optionally includes determining a passion value for the one or more words based on the average amount of time per user spent associated with the content items associated with the one or more words and an average amount of time per user associated with all content items. For example, as disclosed in conjunction with FIG. 19, trend analysis module 932 may use Equation (4) to determine a passion value for a term 954 or n-gram.

The method 2700 optionally includes determining the frequency of the one or more words in the content items, in the extracted modifications, and in search logs, the search logs being saved records of search queries received from client devices in the messaging system. For example, referring to FIG. 13, modification extraction module 910 generates search logs DB 1320 based on search logs 1334, and, referring to FIG. 19, trend analysis module 932 may determine whether the term 954 or n-gram is a trend 936.

The method 2700 optionally includes where the one or more words is an n-gram, and wherein the one or more words is one to seven words. For example, as disclosed in conjunction with FIG. 13 n-gram 1316 may be one to seven words.

The method 2700 optionally includes in response to the one or more words being determined as the trend, generating a report indicating the trend, and causing the report to be displayed by the client device. For example, as disclosed in conjunction with FIG. 24, produce marketing and sales reports module 950 may generate report 2408 such as report 2500.

The method 2700 optionally includes determining whether the one or more words is the trend is further based on a threshold value, the threshold value being based on a ratio of the frequency and the aggregate frequency. For example, as disclosed in conjunction with FIG. 21, method 2100 may be used by trend analysis module 932 to determine whether an n-gram or term 954 is a trend 936.

The method 2700 optionally includes where the frequency and the aggregate frequency are determined further based on search logs, the search logs being saved records of search queries received from client devices in the messaging system. For example, referring to FIG. 19, trend analysis module 932 may use aggregated database 926 to determine frequency and aggregate frequency and modification search logs extraction module 1306 of FIG. 13 may generate search logs DB 1320 that is included in aggregated database 926 by data filtering and aggregation system 922 of FIG. 18.

The method 2700 may optionally include where wherein the frequency is a first frequency, the aggregate frequency is a first aggregate frequency, the content items are first content items, the modifications are first modifications, the extracted modifications are first extracted modifications, and the first frequency is determined for a first time window, and wherein the method further includes: in response to the one or more words being determined as the trend, extracting second modifications from second content items received from the client devices associated with the users, the second content items being modified using the second modifications that comprises the text caption or the media overlay, wherein the second content items were generated in the second time window and the first content items were generated in the first time window, determining a second frequency of the one or more words in the second content items and the second extracted modifications, determining a second aggregate frequency, comparing the relationship between the first frequency and the first aggregate frequency with the relationship between the second frequency and the second aggregate frequency, determining the trend is a downward trend if the relationship between the second frequency and the second aggregate frequency is greater than the relationship between the first frequency and the first aggregate frequency, determining the trend is an upward trend if the relationship between the second frequency and the second aggregate frequency is less than the relationship between the first frequency and the first aggregate frequency, and determining the trend is a spike trend if the relationship between the second frequency and the second aggregate frequency is less than a second threshold than the relationship between the first frequency and the first aggregate frequency. For example, as disclosed in conjunction with FIG. 20, trend analysis module 932 may perform method 2100 of FIG. 21.

The method 2700 may optionally include where the time window is a predetermined number of seconds, minutes, hours, days, weeks, months, or years. For example, as disclosed in conjunction with FIG. 19, time window 938 may have these different predetermined ranges.

The method 2700 may optionally include where the content items comprise messages sent to one or more other users of the messaging system. For example, as disclosed in conjunction with FIG. 9, content 902 may be a message or ephemeral message.

The method 2700 may optionally include determining candidate one or more words from known content components, wherein the known content components comprise names of movies and names of computer games and determining the one or more words based on the candidate one or more words and from the content items and the extracted modifications. For example, modification extraction module 910 may determine n-grams from known content components 1336 and may use the known content components 1336 to determine n-grams from labels assigned to objects by object detection module 1308.

The method 2700 may optionally include adjusting a value of the determined frequency based on a number of external events. For example, trend analysis module 932 may adjust the determined frequency as disclosed in conjunction with FIG. 19 using Equation (6) or Equation (7).

The method 2700 may optionally include where the determined frequency is increased when the external events have a negative correlation with the one or more words and the determined frequency is decreased when the external events have a positive correlation with the one or more words. For example, trend analysis module 932 may adjust the determined frequency as disclosed in conjunction with FIG. 19 using Equation (6).

The method 2700 may optionally include one or more additional operations. The operations of method 2700 may be performed in a different order. One or more of the operations of method 2700 may be optional.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   extracting modifications from content items received from client devices associated with users, the content items being modified using the modifications that comprises a text caption or a media overlay;
   identifying objects within the content items;
   assigning text labels to the objects;
   determining one or more words from the content items and the extracted modifications;
   determining a frequency of the one or more words in the content items, the extracted modifications, and the text labels;
   determining whether the one or more words is a trend based on the frequency and an aggregate frequency; and
   in response to the one or more words being determined as the trend,
   generating trend content associated with the one or more words, the trend content being a text, an image, or an augmentation content.

2. The method of claim 1 further comprising:
   determining the one or more words from two or more text labels from the content items, wherein the one or more words are different than the two or more text labels.

3. The method of claim 2, wherein the one or more words indicates an activity and wherein the two or more text labels indicate objects associated with the activity.

4. The method of claim 1 further comprising:
   determining an average amount of time per user of the users spent associated with the content items, wherein determining whether the one or more words is the trend is further based on the average amount of time per user spent associated with the content items.

5. The method of claim 4 further comprising:
   determining a passion value for the one or more words based on the average amount of time per user spent associated with the content items associated with the one or more words and an average amount of time per user associated with all content items.

6. The method of claim 1 further comprising:
   determining the frequency of the one or more words in the content items, in the extracted modifications, and in search logs, the search logs being saved records of search queries received from client devices in the messaging system.

7. The method of claim 1 wherein the one or more words is an n-gram, and wherein the one or more words is one to seven words.

8. The method of claim 1 further comprising:
   in response to the one or more words being determined as the trend,
   generating a report indicating the trend, and
   causing the report to be displayed by the client device.

9. The method of claim 1 wherein
   determining whether the one or more words is the trend is further based on a threshold value, the threshold value being based on a ratio of the frequency and the aggregate frequency.

10. The method of claim 9, wherein the frequency and the aggregate frequency are determined further based on search logs, the search logs being saved records of search queries received from client devices in the messaging system.

11. The method of claim 9, wherein the frequency is a first frequency, the aggregate frequency is a first aggregate frequency, the content items are first content items, the modifications are first modifications, the extracted modifications are first extracted modifications, and the first frequency is determined for a first time window, and wherein the method further comprises:

in response to the one or more words being determined as the trend, extracting second modifications from second content items received from the client devices associated with the users, the second content items being modified using the second modifications that comprises the text caption or the media overlay, wherein the second content items were generated in the second time window and the first content items were generated in the first time window, determining a second frequency of the one or more words in the second content items and the second extracted modifications, determining a second aggregate frequency, comparing the relationship between the first frequency and the first aggregate frequency with the relationship between the second frequency and the second aggregate frequency, determining the trend is a downward trend if the relationship between the second frequency and the second aggregate frequency is greater than the relationship between the first frequency and the first aggregate frequency, determining the trend is an upward trend if the relationship between the second frequency and the second aggregate frequency is less than the relationship between the first frequency and the first aggregate frequency, and determining the trend is a spike trend if the relationship between the second frequency and the second aggregate frequency is closer to a second threshold than the relationship between the first frequency and the first aggregate frequency.

12. The method of claim 11, wherein the first time window is a predetermined number of seconds, minutes, hours, days, weeks, months, or years.

13. The method of claim 1, wherein the content items comprise messages sent to one or more other users of the messaging system.

14. The method of claim 1 further comprising:
determining candidate one or more words from known content components, wherein the known content components comprise names of movies and names of computer games; and
determining the one or more words based on the candidate one or more words and from the content items and the extracted modifications.

15. The method of claim 1 further comprising:
adjusting a value of the frequency based on a number of external events.

16. The method of claim 15, wherein the frequency is increased when the external events have a negative correlation with the one or more words and the frequency is decreased when the external events have a positive correlation with the one or more words.

17. A system comprising:
one or more computer processors; and
one or more computer-readable mediums storing instructions that, when executed by the one or more computer processors, cause the system to perform operations comprising:
extracting a modifications from content items received from client devices associated with users, the content items being modified using the modifications that comprises a text caption or a media overlay;
identifying objects within the content items;
assigning text labels to the objects;
determining one or more words from the content items and the extracted modifications;
determining a frequency of the one or more words in the content items, the extracted modifications, and the text labels;
determining whether the one or more words is a trend based on the frequency and an aggregate frequency; and
in response to the one or more words being determined as the trend,
generating trend content associated with the one or more words, the trend content being a text, an image, or an augmentation content.

18. A non-transitory computer-readable storage medium including instructions that, when processed by a computer, configure the computer to perform the method of claim 1.

* * * * *